US011500117B1

(12) United States Patent
Tian et al.

(10) Patent No.: US 11,500,117 B1
(45) Date of Patent: Nov. 15, 2022

(54) METHOD AND SYSTEM FOR EVALUATING FILLING CHARACTERISTICS OF DEEP PALEOKARST RESERVOIR THROUGH WELL-TO-SEISMIC INTEGRATION

(71) Applicant: Institute of Geology and Geophysics, Chinese Academy of Sciences, Beijing (CN)

(72) Inventors: Fei Tian, Beijing (CN); Jiangyun Zhang, Beijing (CN); Qingyun Di, Beijing (CN); Wenhao Zheng, Beijing (CN); Zhongxing Wang, Beijing (CN); Yongyou Yang, Beijing (CN); Wenxiu Zhang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/697,562

(22) Filed: Mar. 17, 2022

(30) Foreign Application Priority Data

Sep. 13, 2021 (CN) .......................... 2021110663557

(51) Int. Cl.
*G01V 1/30* (2006.01)
*G01V 1/28* (2006.01)
(52) U.S. Cl.
CPC .............. *G01V 1/306* (2013.01); *G01V 1/282* (2013.01); *G01V 1/307* (2013.01);
(Continued)
(58) Field of Classification Search
CPC ........ G01V 1/306; G01V 1/282; G01V 1/307; G01V 2210/6169; G01V 2210/624; G01V 2210/63
See application file for complete search history.

(56) References Cited

U.S. PATENT DOCUMENTS

2006/0055403 A1  3/2006  Freedman
2009/0125239 A1  5/2009  Niemeyer et al.
(Continued)

FOREIGN PATENT DOCUMENTS

CN    103529475 A    1/2014
CN    109711429 A    5/2019
(Continued)

OTHER PUBLICATIONS

Tian et al., "Structure and Filling Characteristics of Paleokarst Reservoirs in the Northern Tarim Basin, Revealed by Outcrop, Core and Borehole Images" Open Geosci. 2017; 9:266-280 (Year: 2017).*
(Continued)

*Primary Examiner* — Regis J Betsch

(57) ABSTRACT

The present invention belongs to the field of treatment for data identification and recording carriers, and specifically relates to a method and system for evaluating the filling characteristics of a deep paleokarst reservoir through well-to-seismic integration, which aims to solve the problems that by adopting the existing petroleum exploration technology, the reservoir with fast lateral change cannot be predicted, and the development characteristics of a carbonate cave type reservoir in a large-scale complex basin cannot be identified. The method comprises: acquiring data of standardized logging curves; obtaining a high-precision 3D seismic amplitude data body by mixed-phase wavelet estimation and maximum posteriori deconvolution and enhancing diffusion filtering. According to the method and the system, the effect of identifying the development characteristics of the carbonate karst cave type reservoir in the large-scale complex basin can be achieved, and the characterization precision is improved.

10 Claims, 10 Drawing Sheets

(52) U.S. Cl.
CPC ............... *G01V 2210/6169* (2013.01); *G01V 2210/624* (2013.01); *G01V 2210/63* (2013.01)

(56) References Cited

U.S. PATENT DOCUMENTS

| | | | |
|---|---|---|---|
| 2018/0067219 A1* | 3/2018 | Xu | ............ G01V 1/303 |
| 2020/0033495 A1 | 1/2020 | Tavares | |
| 2021/0255349 A1* | 8/2021 | Zhou | ............ G01V 1/282 |
| 2021/0264262 A1* | 8/2021 | Colombo | ............ G01V 3/00 |

FOREIGN PATENT DOCUMENTS

| | | | |
|---|---|---|---|
| CN | 110674841 A | 1/2020 | |
| CN | 112213797 A | 1/2021 | |
| CN | 113009559 A | 6/2021 | |
| FR | 3053125 A1 | 12/2017 | |
| JP | 6494147 B1 | 4/2019 | |

OTHER PUBLICATIONS

Tian et al., "Three-Dimensional Geophysical Characterization of Deeply Buried Paleokarst System in the Tahe Oilfield, Tarim Basin, China", Water 2019, 11, 1045 (Year: 2019).*

Zeng, et al., "Characterizing seismic bright spots in deeply buried, Ordovician Paleokarst strata, Central Tabei uplift, Tarim Basin, Western China", Geophysics, vol. 76, No. 4 (Jul.-Aug. 2011) (Year: 2011).*

Zeng, et al., "Three-dimensional seismic geomorphology and analysis of the Ordovician paleokarst drainage system in the central Tabei Uplift, northern Tarim Basin, western China", AAPG Bulletin, v. 95, No. 12 (Dec. 2011), pp. 2061-2083 (Year: 2011).*

\* cited by examiner

METHOD AND SYSTEM FOR EVALUATING FILLING CHARACTERISTICS OF DEEP PALEOKARST RESERVOIR THROUGH WELL-TO-SEISMIC INTEGRATION

CROSS-REFERENCE TO RELATED APPLICATIONS

The application claims priority to Chinese patent application No. 2021110663557, filed on Sep. 13, 2021, the entire contents of which are incorporated herein by reference.

TECHNICAL FIELD

The present invention belongs to the field of treatment for data identification and recording carriers, and specifically relates to a method and system for evaluating the filling characteristics of a deep paleokarst reservoir through well-to-seismic integration.

BACKGROUND

Deep strata (the buried depth over 4,500 m) of oil and gas bearing basins are rich in oil and gas resources and have become the important field of industrial exploration of petroleum. Carbonate reservoirs account for 52% of proven oil reserves and 60% of production in the world, which are the main target of deep oil and gas exploration.

Due to the complex lithology, changeable diagenesis and random fractures of carbonate rocks, a paleokarst reservoir is more highly heterogeneous. Sparse logging curves have high longitudinal resolution ratio and only can reflect information of the strata with limited depth (less than 10 m generally) near a wellbore, and the paleokarst reservoir that is far away from the wellbore still has great change. Therefore, detection technologies and experience that are gained from shallow clastic rocks and porous carbonate reservoirs cannot be directly used in the detection for a deep paleokarst reservoir. However, the above descriptions are often neglected by those skilled in the art, which leads to the poorer evaluation effect of the deep paleokarst reservoir.

The current evaluation for the filling characteristics of the paleokarst reservoir has the following problems: the paleokarst cave type reservoir is buried deeply, and the absorption and attenuation of seismic wave energy are strong, which lead to the significant decrease of the dominant frequency of seismic data (less than 25 Hz), greatly reduced resolution ratio (10 m generally) and too low signal-to-noise ratio in a deep window. However, drilling, logging and rock-core samples indicate that the height of most caves is less than 5 m, so the existing resolution ratio of 3D (Three-Dimensional) seismic data is difficult to achieve the accurate identification effect. In addition, compared with the logging curves, seismic attributes contain lower content of lithological and physical information, so that the filling characteristics of the paleokarst reservoir cannot be effectively identified.

The key problems of the research on the paleokarst reservoir are: how to accurately understand the structure of a deeply buried paleokarst system, how to effectively identify the position of the paleokarst reservoir by utilizing geophysical data, and how to characterize the internal filling characteristics of a paleokarst cave system with high precision.

SUMMARY

In order to solve the technical problems of evaluation for the filling characteristics of a deep paleokarst reservoir at present, namely, the problems that the inversion result is directly controlled by inter-well interpolation in the high-frequency band, the lateral prediction is highly random, and the prediction for the deep paleokarst reservoir with fast change of lateral filling characteristics is poor in precision, which are caused by that in the existing methods for analyzing the filling characteristics of a cave type reservoir in petroleum exploration, only geological data is regarded as the constraint for a random simulation conclusion, the contribution of seismic information to the optimization for logging samples is not considered, and data is too complex as the reservoir is described by adopting all logging characteristic parameters, the present invention provides a method for evaluating the filling characteristics of the deep paleokarst reservoir through well-to-seismic integration, which comprises the following steps:

Step S100, acquiring original geophysical logging data: acquiring original logging data of each sample well by logging equipment, comprising: measuring the self-potential SP of each sample well by a measuring electrode, measuring the natural gamma ray GR of each sample well by a natural gamma ray downhole device and a natural gamma ray ground instrument, and acquiring the caliper CAL of each sample well by a caliper arm; and acquiring data of a resistivity curve: deep lateral logging RLLD, shallow lateral logging RLLS and micro-lateral logging RLLM, and data of a physical property characterization curve: compensated neutrons CNL, a compensated acoustic curve AC and a density curve DEN by traditional logging equipment; and acquiring definite lithological information and physical information of an individual depth segment based on imaging logging information, drilling information, mud logging information and rock-core information, so as to determine depth data of a marker bed at a target horizon;

Step S200, acquiring seismic data: acquiring data of an original seismic wave reflected signal by a seismic wave excitation device and a receiving device and acquiring isochronous 3D (Three-Dimensional) distribution of the marker bed at the target horizon according to the waveform of the data of the original seismic wave reflected signal;

Step S300, preprocessing original geophysical logging data: drawing data of logging curves based on all original logging data of the sample wells and carrying out abnormal value processing and standardization processing, so as to obtain data of standardized logging curves;

Step S400, preprocessing the seismic data: obtaining a high-precision 3D seismic amplitude data body by mixed-phase wavelet estimation and maximum posteriori deconvolution and enhancing diffusion filtering based on the data of the seismic wave reflected signal;

Step S500, carrying out well-to-seismic calibration and selecting the characteristic parameters: acquiring a wave impedance curve of each sample well based on the compensated acoustic curve AC and the density curve DEN in the data of the standardized logging curve, so as to calculate a reflection coefficient curve; acquiring the preferred frequency of the ricker wavelet, so that the preferred frequency is consistent with the dominant frequency of the high-precision 3D seismic amplitude data body; carrying out convolution operation on the ricker wavelet and the reflection coefficient curve, so as to obtain a synthetic seismic record; comparing the depth data of the marker bed at the target horizon and the isochronous 3D distribution of the marker bed at the target horizon for well-to-seismic calibration; calculating the correlation between the synthetic seismic record and the waveform of a near-well seismic channel; and when the correlation is more than or equal to a preset first threshold, judging that the result of well-to-seismic calibration is qualified, so as to obtain the time-depth transforming relationship between the data of the logging curve and the seismic record and the characteristic parameters sensitive to the reservoir, wherein a method for obtaining the characteristic parameters sensitive to the reservoir comprises:

drawing a columnar statistical graph of responses of the logging parameters, which are generated to different geological bodies near the wells; and when the numerical value of data of a certain standardized logging curve can be used for distinguishing data points that are more than a second threshold preset by different logging interpretation conclusions, selecting the data of the standardized logging curve as the characteristic parameters sensitive to the reservoir, wherein the characteristic parameters sensitive to the reservoir at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;

Step S600, acquiring a first group of PCA (Principal Component Analysis) data: optimizing the data of the standardized logging curves from the characteristic parameters sensitive to the reservoir, wherein the number of pieces of the data is preset; and analyzing the characteristic parameters sensitive to the reservoir by a PCA method, so as to obtain the first group of PCA data sensitive to the reservoir;

Step S700, constructing an isochronous framework model: constructing the isochronous framework model based on the law of sedimentary strata reflected by the high-precision 3D seismic amplitude data body and the time-depth transforming relationship;

Step S800, simulating the parameters of an inter-well reservoir: based on the first group of PCA data of each sample well, determining the parameter of the optimal sample number, which can reflect the overall geological condition; selecting the first group of PCA data of the sample wells to construct an initial model, wherein the first group of PCA data has the highest correlation of the seismic waveforms, and the number of pieces of first group of PCA data is equal to the parameter of the optimal sample number; constantly correcting the parameters of the initial model; and outputting a first group of high-precision characteristic value simulation result data bodies, wherein the first group of high-precision characteristic value simulation result data bodies is data bodies corresponding to the first group of PCA data one to one;

Step S900, characterizing the boundary of an inter-well karst cave system: carrying out cross analysis based on the first group of PCA data of the sample wells, so as to obtain a distribution diagram of a first group of discrete data points of various geological bodies;

based on the lithological information and the physical information, acquiring the interpretation conclusion of the distribution diagram of the first group of discrete data points of various geological bodies, dividing a karst cave and a surrounding rock to construct a cross plot of the first group of PCA data, and acquiring the threshold of the first group of PCA data, which is required for division of the karst cave; and based on the threshold of the first group of PCA data, carrying out cross analysis on the first group of high-precision characteristic value simulation result data bodies, so as to obtain the characteristics of the 3D spatial morphologies of the karst cave;

Step S1000, characterizing the lithological and physical boundaries of internal filling of the cave: analyzing the characteristic parameters sensitive to the reservoir, which correspond to data points of the karst cave, by the PCA method, so as to obtain a second group of PCA data sensitive to the response of fillings;

based on the second group of PCA data, generating a second group of high-precision characteristic value simulation result data bodies by the method described in Step S800;

based on the second group of PCA data sensitive to the response of the fillings, carrying out cross analysis to obtain a distribution diagram of a second group of discrete data points of various geological bodies;

based on the lithological information and the physical information, acquiring the interpretation conclusion of the second group of discrete data points of various geological bodies, and distinguishing the types of the fillings to construct a cross plot of the second group of PCA data, so as to obtain the threshold of the second group of PCA data, which is required for division of the types of the internal fillings of the karst cave; and based on the threshold of the second group of PCA data, carrying out cross analysis on the second group of high-precision characteristic value simulation result data bodies, so as to obtain the characteristics of the 3D spatial morphologies of different types of internal fillings of the karst cave; and Step S1100, describing the structure and the filling of the paleokarst cave: based on the characteristics of the 3D spatial morphologies of the karst cave and the characteristics of the 3D spatial morphologies of different types of internal fillings of the karst cave, engraving the spatial distribution of the paleokarst cave and the development characteristics of the internal filling adopting different types of internal fillings by adopting a lithology shielding technology and a 3D engraving technology.

In some preferred implementation manners, the step of measuring the self-potential SP of each sample well by the measuring electrode and measuring the natural gamma ray GR of each sample well by the natural gamma ray downhole device and the natural gamma ray ground instrument specifically comprises:

measuring the self-potential SP of each sample well by the measuring electrode:

arranging a measuring electrode $Q_{electrode}$ on the ground and arranging a measuring electrode $Z_{electrode}$ under the well by a cable;

lifting the measuring electrode $Z_{electrode}$ along the well axis to measure the change of the self-potential with the well depth, wherein a calculation method of the value of the self-potential is shown as follows:

$$E_A = E_d - E_{da} = (K_d - K_{da})lg\frac{R_{mf}}{R_w} = K_{diffusion}lg\frac{R_{mf}}{R_w}$$

wherein $E_A$ represents the total self-potential; $K_d$ represents the coefficient of diffusion potential; $K_{da}$ represents the coefficient of diffusion and adsorption potential; $R_{mf}$ represents the value of resistivity of mud filtrate; and $R_w$ represents the value of resistivity of stratum water; and measuring the natural gamma ray GR of each sample well by the natural gamma ray downhole device and the natural gamma ray ground instrument:

wherein the natural gamma ray downhole device comprises a detector, an amplifier and a high-voltage power supply;

acquiring the natural gamma ray by the detector, transforming the natural gamma ray into an electric pulse signal and amplifying the electric pulse signal by the amplifier; and transforming the number of electric pulses formed in each minute into the potential difference and recording the potential difference by the ground instrument.

In some preferred implementation manners, the PCA method specifically comprises:

Step B100, calculating the average value of the samples:

$$\bar{x} = \frac{1}{N}\sum_{i=1}^{N} x_i$$

wherein N represents the total sample number of the curve; i represents the parameter of the sample number, $x_i$ represents the $i^{th}$ data of the characteristic parameters of the sample, and $\bar{x}$ represents the average value of the samples;

Step B200, normalizing each characteristic parameter curve to obtain the normalized data $x_S$ of the characteristic parameters of the sample:

$$x_S = \frac{x - \bar{x}}{N}$$

wherein x represents the data of sampling points of the characteristic parameters of the sample;

Step B300, based on the normalized data $x_S$ of the characteristic parameters of the samples, calculating the covariance Cov(X, Y) of the characteristic parameters of the samples:

$$\mathrm{Cov}(X, Y) = E[(X - E(X))(Y - E(Y))] = \frac{1}{N-1}\sum_{c=1}^{N}(x_c - \bar{x})(y_c - \bar{y})$$

wherein $x_c$ represents the $c^{th}$ data of the characteristic parameters of an X sample, and $y_c$ represents the $c^{th}$ data of the characteristic parameters of a Y sample;

Step B400, based on the covariance of the characteristic parameters of the samples, constructing a covariance matrix of the characteristic parameters of the samples:

$$\mathrm{Cov}(X, Y, Z) = \begin{bmatrix} \mathrm{Cov}(X, X) & \mathrm{Cov}(X, Y) & \mathrm{Cov}(X, Z) \\ \mathrm{Cov}(Y, X) & \mathrm{Cov}(Y, Y) & \mathrm{Cov}(Y, Z) \\ \mathrm{Cov}(Z, X) & \mathrm{Cov}(Z, Y) & \mathrm{Cov}(Z, Z) \end{bmatrix}$$

wherein Z represents the data of the characteristic parameters of the sample, and the covariance matrix comprising the data of the characteristic parameters of p types of samples is:

$$\mathrm{Cov}(K) = \begin{bmatrix} \mathrm{Cov}(K_{1,1}) & \cdots & \mathrm{Cov}(K_{1,p}) \\ \vdots & \ddots & \vdots \\ \mathrm{Cov}(K_{p,1}) & \cdots & \mathrm{Cov}(K_{p,p}) \end{bmatrix}$$

wherein K represents the multiple data of the characteristic parameters of the samples, and $\mathrm{Cov}(K_{1,p})$ represents the covariance of first data of the characteristic parameters of the sample and $p^{th}$ data of the characteristic parameters of the sample;

Step B500, based on the covariance matrix comprising p types of data of the characteristic parameters of the samples, acquiring the characteristic values $\hat{\lambda}_1, \hat{\lambda}_2, \ldots, \hat{\lambda}_p$ and p characteristic vectors $\hat{e}_1, \hat{e}_2, \ldots \hat{e}_p$ of the covariance matrix; and based on the characteristic values and the characteristic vectors, calculating the PCA data comprising p types of characteristic values:

$$m_j = \sum_{j=1}^{p} \hat{e}_j n_j,$$

wherein $m_j$ represents a $j^{th}$ vector of the PCA data; $n_j$ represents a $j^{th}$ vector of the data of the characteristic parameters of the sample; $\hat{e}_j$ represents a $j^{th}$ characteristic vector of the data of the characteristic parameters of the sample; and j meets the condition: j∈ 1, 2, . . . p and represents the counting parameter; and Step B600, based on the PCA data comprising p types of characteristic values, sorting the corresponding characteristic values from large to small, so as to obtain the characteristic values $\hat{\lambda}_1, \hat{\lambda}_2, \ldots, \hat{\lambda}_p$ sorted from large to small, and calculating the accumulative contribution of the covariance:

$$C_k = \sum_{j=1}^{k} \frac{\lambda_j}{\Sigma_j^p \lambda_j}$$

wherein $\lambda_j$ represents the $j^{th}$ characteristic value sorted from large to small, $C_k$ represents the accumulative contribution of the front k covariance, and k meets the condition: k∈ 1, 2, . . . , p; and when k is constantly increased from 1, selecting the vector of the PCA data, which corresponds to the corresponding front k covariance when $C_k$ is more than the third threshold for the first time, i.e. the PCA data obtained by the PCA method.

In some preferred implementation manners, Step S400 specifically comprises:

Step S410, based on the data of the seismic wave reflected signal, expressing a frequency domain seismic record convolution model as:

$s(\omega)=\sigma(\omega)\varepsilon(\omega)$ wherein $s(\omega)$ represents the seismic record after Fourier transformation; $\sigma(\omega)$ represents the wavelet after Fourier transformation; $\varepsilon(\omega)$ represents the frequency spectrum of the reflection coefficient after Fourier transformation; and co represents the angular frequency;

Step S420, transforming logarithms on the two sides of the equation of the frequency domain seismic record convolution model into a linear system to obtain a linear seismic record convolution model:

$\ln s(\omega)=\ln\sigma(co)+\ln\varepsilon(\omega)$

Step S430, carrying out inverse Fourier transformation on the linear seismic record convolution model to obtain a complex cepstrum sequence:

$\tilde{s}(t)=\tilde{\sigma}(t)+\tilde{\varepsilon}(t)$ wherein $\tilde{s}(t)$ represents a complex cepstrum sequence of a seismic waveform record; $\tilde{\sigma}(t)$ represents a complex cepstrum sequence of the seismic wavelet; $\tilde{\epsilon}(t)$ represents a complex cepstrum sequence of the stratum reflection coefficient; and t represents the time of the seismic waveform record;

Step S440, based on the complex cepstrum sequence, separating the wavelet and the reflection coefficient by a low-pass filter and extracting a wavelet amplitude spectrum;

Step S450, acquiring a simulated seismic wavelet amplitude spectrum by a least square method:

$$\sigma(f)=A(f)f^{\alpha}e^{G(f)}$$

wherein the fitting parameter $\alpha \geq 0$ of the least square method is a constant; $\sigma(f)$ represents the wavelet amplitude spectrum; H(f) and A(f) represent the polynomials off; and f represents the frequency of the seismic wavelet;

Step S460, based on the simulated seismic wavelet amplitude spectrum, obtaining the maximum phase component and the minimum phase component of the wavelet, wherein it is assumed that the maximum phase component of the wavelet $\sigma(t)$ is u(t), and the minimum phase component of the wavelet $\sigma(t)$ is v(t), the wavelet $\sigma(t)$ is:

$$\sigma(t)=u(t)\cdot v(t);$$

and the complex cepstrum of the amplitude spectrum is expressed as follows:

$$2\widetilde{\sigma_0}(t)=\tilde{u}(t)+\tilde{v}(t)+\tilde{u}(-t)+\tilde{v}(-t)$$

wherein the complex cepstrum $\widetilde{\sigma_0}(t)$ of the amplitude spectrum is displayed symmetrically on the positive axis and the negative axis; $\tilde{v}(-t)$ represents the complex cepstrum of the minimum phase function corresponding to the maximum phase component v(t) of the seismic wavelet; and $\tilde{u}(-t)$ represents the complex cepstrum of the maximum phase function corresponding to the minimum phase component u(t) of the seismic wavelet;

Step S470, based on the complex cepstrum in the amplitude spectrum, determining a group of mixed-phase wavelet sets with the same amplitude spectrum; constantly adjusting the parameters of the Yu wavelet; keeping the low frequency, broadening the high frequency and properly increasing the dominant frequency to construct the expected output wavelet form; and looking for the best balance point for improving the resolution ratio and the fidelity with reference to a signal-to-noise ratio spectrum under the control of the logging curves, so as to obtain data of the waveform after shaping;

Step S480, based on the data of the waveform after shaping, constructing a tensor diffusion model:

$$\begin{cases} \dfrac{\partial U}{\partial \tau} = \text{div}(D \cdot \nabla U) \\ U|_{\tau=0} = U_0 \end{cases}$$

wherein T represents the diffusion time; div represents the divergence operator; D represents the diffusion tensor; U represents the diffusion filtering result; $U|_{\tau=0}$ represents the diffusion filtering result when $\tau=0$; $U_0$ represents the data of the waveform after shaping when $\tau=0$; and as the initial condition of the tensor diffusion model, $\nabla U$ represents the gradient of the diffusion filtering result;

based on the tensor diffusion model, constructing the gradient structure tensor:

$$J_\beta(\nabla U)=G_\rho * J_0=G_\rho *(\nabla U(\nabla U)^T)$$

wherein U represents the diffusion filtering result, and $J_0$ represents the tensor product of the gradient vector;

the Gaussian function with the scale of $\rho$ is expressed by $G_\rho$:

$$G_\rho(r)=(2\pi\rho^2)^{-3/2}\exp(-|r|^2/(2\rho^2))$$

wherein r represents the calculation radius;

the characteristic vector of the structure tensor is:

$$J_\rho(\nabla U) = (v_1\ v_2\ v_3)\begin{pmatrix} \xi_1 & 0 & 0 \\ 0 & \xi_2 & 0 \\ 0 & 0 & \xi_3 \end{pmatrix}(v_1\ v_2\ v_3)^T$$

wherein $v_1$, $v_2$ and $v_3$ represent three characteristic vectors of the gradient structure tensor and can be regarded as a local orthogonal coordinate system; $v_1$ points to the gradient direction of the seismic signal; a plane formed by $v_2$ and $v_3$ is in parallel to the local structure characteristics of the seismic signal; and $\xi_1$, $\xi_2$ and $\xi_3$ represent three characteristic values corresponding to $v_1$, $v_2$ and $v_3$ respectively;

Step S490, based on the characteristic vector of the structure tensor, respectively calculating the confidence degree of a linear structure, the confidence degree of a face structure and the diffusion tensor, wherein the confidence degree $C_{line}$ of the linear structure is:

$$C_{line} = \frac{\lambda_2 - \lambda_3}{\lambda_2 + \lambda_3};$$

the confidence degree $C_{plane}$ of the face structure is:

$$C_{plane} = \frac{\lambda_1 - \lambda_2}{\lambda_1 + \lambda_2};$$

the diffusion tensor D is:

$$D = (v_1\ v_2\ v_3)\begin{pmatrix} \mu_1 & 0 & 0 \\ 0 & \mu_2 & 0 \\ 0 & 0 & \mu_3 \end{pmatrix}(v_1\ v_2\ v_3)^T = \begin{pmatrix} D_{11} & D_{12} & D_{13} \\ D_{21} & D_{22} & D_{23} \\ D_{31} & D_{32} & D_{33} \end{pmatrix}$$

wherein $\mu_1$, $\mu_2$ and $\mu_3$ represent three non-negative characteristic values of the diffusion tensor and respectively represent the intensity of filtering of the diffusion filter in the three characteristic directions $v_1$, $v_2$ and $v_3$; and Step S4100, repeating the steps S480-S490 until the preset number of iterations is achieved, so as to obtain the diffusion filtering result, i.e. the high-precision 3D seismic amplitude data body.

In some preferred implementation manners, a calculation method of the simulated seismic wavelet amplitude spectrum comprises:

positioning the maximum value of an amplitude spectrum in the data of the seismic wave reflected signal and the frequency corresponding to the maximum value;

fitting the maximum value of the amplitude spectrum of the seismic signal and the simulated seismic wavelet amplitude spectrum by the least square method to obtain the coefficients of the polynomials of the parameters a and H (f), so as to obtain the fit amplitude value of the corresponding frequency of the maximum value; and dividing the fit amplitude value of the corresponding frequency by the maximum value of the amplitude spectrum of the seismic signal, so as to fit the coefficient of the polynomial A(f) by the quotient.

In some preferred implementation manners, the time-depth transforming relationship between the data of the logging curve and the seismic record is:

$$T_s = T_{H_0} + 2\sum_{i=1}^{n} T_i \cdot \Delta H$$

wherein $T_{H_0}$ represents the time of the seismic signal corresponding to the initial depth of acoustic logging; $T_i$ represents the time difference of the acoustic wave; i represents the sequence number of time operation between every two sampling points; $\Delta H$ represents the sampling interval of the data of the logging curve; and $T_s$ represents the two-way travel time of the seismic wave.

In some preferred implementation manners, Step S800 specifically comprises Step S810-Step S890:

Step S810, optionally selecting a sample well as a reference target well and setting the parameter of the initial sample number as 1;

Step S820, according to the principle of similarity of the waveforms, selecting the first group of PCA data of the sample wells and a first group of PCA data of the reference target well for correlation analysis, so as to obtain the correlation value of the parameter of the sample number and the first group of PCA data of the reference target well, wherein the number of pieces of first group of PCA data of the sample wells is equal to the parameter of the sample number;

Step S830, increasing the parameter of the sample number 1 by 1; repeating the method of Step S820 to obtain the correlation value of the parameter of the sample number and the first group of PCA data of the reference target well, which corresponds to each parameter of the sample number; and connecting all the correlation values of the parameter of the sample number and the first group of PCA data of the reference target well, so as to obtain a correlation curve with the correlation of the first group of PCA data of the reference well changing with the parameter of the sample number;

Step S840, selecting another sample well as a reference target well; repeating the methods of Step S810-Step S830 to obtain multiple correlation curves with the correlation of the first group of PCA data of the reference well changing with the parameter of the sample number; fitting all the correlation curves with the correlation of the waveforms of the first group of PCA data of the reference well changing with the parameter of the sample number into an overall correlation curve; selecting an inflection point capable of enabling the correlation in the overall correlation curve to be increased with the increase of the parameter of the sample number and to be finally kept at a stable position; and determining the parameter of the optimal sample number;

Step S850, based on the high-precision 3D seismic amplitude data body and the isochronous framework model, calculating the correlations of the waveforms of point positions to be detected and the positions of the sample wells; sorting the correlations of the waveforms from large to small; selecting the first group of PCA data of the sample wells having the highest correlation of the seismic waveforms and the number of pieces of first group of PCA data being equal to the parameter of the optimal sample number; and based on the sample wells corresponding to the characteristic data of the seismic waveforms of the sample wells having the highest correlation, constructing the initial model by an inter-well characteristic parameter interpolation manner;

Step S860, based on the initial model, selecting the first group of PCA data of the sample wells as prior information, wherein the first group of PCA data has the highest correlation of the seismic waveforms, and the number of pieces of first group of PCA data is equal to the parameter of the optimal sample number;

Step S870, carrying out matched filtering on the initial model and the prior information, so as to obtain the maximum likelihood function;

Step S880, based on the maximum likelihood function and the prior information, solving the statistical distribution density of the posterior probabilities under a Bayesian framework, and sampling the statistical distribution density of the posterior probabilities to obtain the objective function; and Step S890, sampling the distribution of the posterior probabilities by an MCMC (Markov Chain Monte Carlo) method and the criterion for Metropolis-Hastings sampling and by taking the objective function as the input of the initial model; constantly optimizing the parameters of the initial model; selecting the solution when the maximum value is selected for the objective function as random implementation; selecting the average value of multiple random implementations as the expected output value; and taking the expected output value as the high-precision characteristic value simulation result data bodies, wherein the parameters in the high-precision characteristic value simulation result data bodies correspond to the first group of PCA data one to one.

In some preferred implementation manners, Step S880 specifically comprises:

Step S881, by utilizing the law that the white noise meets Gaussian distribution, expressing the parameter of the high-precision characteristic value simulation result data bodies as:

$$Y_{sim} = X_{sim} + N_{noise}$$

wherein $Y_{sim}$ represents the parameter of the high-precision characteristic value simulation result data bodies, $X_{sim}$ represents the to-be-solved actual characteristic parameter value of the subsurface stratum, and $N_{noise}$ represents the random noise;

Step S882, as $\|X_{sim} - X_p\|^2$ also meets Gaussian distribution, determining the initial objective function as:

$$J_1 = \frac{\|x_{sim} - x_p\|^2}{2\sigma^2}$$

wherein $J_i$ represents the function related to posterior information; $X_p$ represents the expected value of the characteristic parameter, which is obtained by calculation after the steps of selecting the sample wells based on the optimal sample number, carrying out matched filtering on characteristic curves of the sample wells and then solving the statistical distribution density of the posterior probabilities; and $\sigma$ represents the covariance of the white noise; and Step S883, based on the initial objective function, introducing the prior information into the objective function by maximum posterior estimation, so as to obtain the following stable objective function:

$$J(Z_{sim}) = J_1(Z_{sim}) + \lambda^2 J_2(Z_{sim})$$

wherein $Z_{sim}$ represents the characteristic parameter to be simulated; $J_2$ represents the function related to the prior information of the geological data and the logging data; and $\lambda$ represents the smoothing parameter used for coordinating the mutual effect between $J_1$ and $J_2$.

In some preferred implementation manners, Step S890 specifically comprises:

Step S891, setting M as the target space, setting n as the total sample number and setting m as the sample number when the Markov chain is stable;

Step S892, presetting a Markov chain to enable the Markov chain to be converged to stable distribution;

Step S893, starting from a certain point $P_0$ in M, carrying out sampling simulation by the Markov chain and generating a point sequence: $P_1, \ldots, P_n$ Step S894, expressing the expected estimation of the function $J_2(Z)$ as:

$$E[J_2(P)] = \frac{1}{n-m}\sum_{L=m+1}^{n} f(P^{(1)})$$

wherein n represents the total sample number, m represents the sample number when the Markov chain is stable, and L represents the accumulated parameter;

Step S895, selecting the transition function $q(P; P^{(h-1)})$ and the initial value $P^{(0)}$, wherein if the parameter value when the $h^{th}$ iteration is started is $P^{(h-1)}$, the $h^{th}$ iteration process comprises:

extracting the alternative value P' from $q(P; P^{(h-1)})$ and calculating the probability of acceptance $\alpha(P^{(h-1)}, P')$ of the alternative value P':

$$\alpha(P^{(h-1)}, P') = \min\left\{\frac{\pi(P^{(h-1)}; P')}{\pi(P^{(h-1)}q(P'; P^{(h-1)}))}\right\};$$

Step S896, enabling $P^{(h)}=P$ with $\alpha(P^{(h-1)}, P')$ and enabling $P^{(h)}=P^{(h-1)}$ with the probability $1-\alpha(P^{(h-1)}, P')$; and Step S897, constantly disturbing the parameters of the initial model, repeating the methods of Step S892-Step S896 to achieve the preset number of iterations $h_s$, and obtaining posterior samples $P^{(1)}, P^{(2)}, P^{(3)} \ldots P^{(h_s)}$ so as to calculate the matrix at each order of posterior distribution to obtain the expected output value, wherein the expected output value is taken as the first group of high-precision characteristic value simulation result data bodies.

In some preferred implementation manners, Step S300 comprises:

Step S310, drawing data of an original logging curve based on the original logging data;

Step S320, removing outliers to obtain data of the logging curve with the outliers removed based on the data of the original logging curve; and Step S330, superposing all data of a histogram of the single logging curve at the positions of the sample wells in a work area based on the data of the logging curve with the outliers removed, and integrating the thresholds to obtain the data of the standardized logging curve.

Another aspect of the present invention provides a system for evaluating the filling characteristics of the deep paleokarst reservoir through well-to-seismic integration. The system comprises: an original geophysical logging data acquisition module, a seismic data acquisition module, an original geophysical logging data preprocessing module, a seismic data preprocessing module, a well-to-seismic calibration and characteristic parameter selection module, a module for acquiring the first group of PCA data, an isochronous framework model constructing module, an inter-well reservoir parameter simulation module, a module for characterizing the boundary of the inter-well karst cave system, a module for characterizing the lithological and physical boundaries of internal filling of the cave and a module for describing the structure and the filling of the paleokarst cave;

the original geophysical logging data acquisition module is configured to acquire the original logging data of each sample well by the logging equipment, comprising: measuring the self-potential SP of each sample well by the measuring electrode, measuring the natural gamma ray GR of each sample well by the natural gamma ray downhole device and the natural gamma ray ground instrument, and acquiring the caliper CAL of each sample well by the caliper arm; and acquiring the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN by the traditional logging equipment; and acquiring the definite lithological information and physical information of the individual depth segment based on the imaging logging information, the drilling information, the mud logging information and the rock-core information, so as to determine the depth data of the marker bed at the target horizon;

the seismic data acquisition module is configured to acquire the data of the original seismic wave reflected signal by the seismic wave excitation device and the receiving device and acquire isochronous 3D distribution of the marker bed at the target horizon according to the waveform of the data of the original seismic wave reflected signal;

the original geophysical logging data preprocessing module is configured to draw the data of the logging curves based on the original logging data of the sample wells and carry out abnormal value processing and standardization processing, so as to obtain the data of the standardized logging curves;

the seismic data preprocessing module is configured to obtain the high-precision 3D seismic amplitude data body by mixed-phase wavelet estimation and maximum posteriori deconvolution and enhancing diffusion filtering based on the data of the seismic wave reflected signal;

the well-to-seismic calibration and characteristic parameter selection module is configured to carry out well-to-seismic calibration and characteristic parameter selection: acquiring the wave impedance curve of each sample well based on the compensated acoustic curve and the density curve DEN in the data of the standardized logging curve, so as to calculate the reflection coefficient curve; acquiring the preferred frequency of the ricker wavelet, so that the preferred frequency is consistent with the dominant frequency of the high-precision 3D seismic amplitude data body; carrying out convolution operation on the ricker wavelet and the reflection coefficient curve, so as to obtain the synthetic seismic record; comparing the depth data of the marker bed at the target horizon and the isochronous 3D distribution of the marker bed at the target horizon for well-to-seismic calibration; calculating the correlation between the synthetic seismic record and the waveform of the near-well seismic channel; and when the correlation is more than or equal to the preset first threshold, judging that the result of well-to-seismic calibration is qualified, so as to obtain the time-depth transforming relationship between the data of the logging curve and the seismic record and the characteristic parameters sensitive to the reservoir, wherein the method for obtaining the characteristic parameters sensitive to the reservoir comprises:

drawing the columnar statistical graph of the responses of logging parameters, which are generated to the different geological bodies near the wells; and when the data of the certain standardized logging curve can be used for distinguishing the data points that are more than the second threshold preset by the different logging interpretation conclusions, selecting the data of the standardized logging curve as the characteristic parameters sensitive to the reservoir, wherein the characteristic parameters sensitive to the reservoir at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;

the module for acquiring the first group of PCA data is configured to optimize the data of the standardized logging curves from the characteristic parameters sensitive to the reservoir, wherein the number of pieces of the data is preset; and carry out dimensionality reduction on the characteristic parameters sensitive to the reservoir by the PCA method, so as to obtain the first group of PCA data;

the isochronous framework model constructing module is configured to construct the isochronous framework model based on the law of sedimentary strata reflected by the high-precision 3D seismic amplitude data body and the time-depth transforming relationship;

the inter-well reservoir parameter simulation module is configured to determine the parameter of the optimal sample number, which can reflect the overall geological condition, based on the first group of PCA data of each sample well; select the first group of PCA data of the sample wells to construct the initial model, wherein the first group of PCA data has the highest correlation of the seismic waveforms, and the number of pieces of first group of PCA data is equal to the parameter of the optimal sample number; constantly correct the parameters of the initial model; and output the first group of high-precision characteristic value simulation result data bodies, wherein the first group of high-precision characteristic value simulation result data bodies is the data bodies corresponding to the first group of PCA data one to one;

the module for characterizing the boundary of the inter-well karst cave system is configured to carry out cross analysis based on the first group of PCA data of the sample wells, so as to obtain the distribution diagram of the first group of discrete data points of various geological bodies;

based on the lithological information and the physical information, acquire the interpretation conclusion of the distribution diagram of the first group of discrete data points of various geological bodies, divide the karst cave and the surrounding rock to construct the cross plot of the first group of PCA data, and acquire the threshold of the first group of PCA data, which is required for division of the karst cave; and based on the threshold of the first group of PCA data, carry out cross analysis on the first group of high-precision characteristic value simulation result data bodies, so as to obtain the characteristics of the 3D spatial morphologies of the karst cave;

the module for characterizing the lithological and physical boundaries of internal filling of the cave is configured to characterize the lithological and physical boundaries of internal filling of the cave: analyzing the characteristic parameters sensitive to the reservoir, which correspond to the data points of the karst cave, by the PCA method, so as to obtain the second group of PCA data sensitive to the response of the fillings;

based on the second group of PCA data, generating the second group of high-precision characteristic value simulation result data bodies by the functions described in the inter-well reservoir parameter simulation module;

based on the second group of PCA data sensitive to the response of the fillings, carrying out cross analysis to obtain the distribution diagram of the second group of discrete data points of various geological bodies;

based on the lithological information and the physical information, acquiring the interpretation conclusion of the second group of discrete data points of various geological bodies, and distinguishing the types of the fillings to construct the cross plot of the second group of PCA data, so as to obtain the threshold of the second group of PCA data, which is required for division of the types of the internal fillings of the karst cave; and based on the threshold of the second group of PCA data, carrying out cross analysis on the second group of high-precision characteristic value simulation result data bodies, so as to obtain the characteristics of the 3D spatial morphologies of different types of internal fillings of the karst cave; and the module for describing the structure and the filling of the paleokarst cave is configured to engrave the spatial distribution of the paleokarst cave and the development characteristics of the internal filling adopting different types of internal fillings by adopting the lithology shielding technology and the 3D engraving technology based on the characteristics of the 3D spatial morphologies of the karst cave and the characteristics of the 3D spatial morphologies of different types of internal fillings of the karst cave.

The third aspect of the present invention provides electronic equipment, which comprises:

at least one processor; and a memory that is in communication connection with the at least one processor, wherein the memory is configured to store instructions capable of being executed by the processor(s); and the instructions are used for being executed by the processor(s) for realizing the method for evaluating the filling characteristics of the deep paleokarst reservoir through well-to-seismic integration.

The fourth aspect of the present invention provides a computer readable storage medium; the computer readable storage medium is configured to store computer instructions; and the computer instructions are used for being executed by a computer for realizing the method for evaluating the filling characteristics of the deep paleokarst reservoir through well-to-seismic integration.

The method and the system of the present invention have the beneficial effects that:

in the present invention, under the conditions of fully utilizing the logging data and the seismic data, adopting a machine learning algorithm and taking a wave indication simulation method as a core, sensitive parameters are established by using a PCA algorithm, so that the structure and the filling of the reservoir are precisely identified by the logging data; and then, 3D seismic simulation data bodies are established by using the sensitive parameters and the 3D seismic data, so that the logging interpretation result with high resolution is extrapolated to the inter-well 3D large-scale area, and the filling characteristics of the deep paleokarst reservoir are evaluated finally.

In the present invention, the 3D parameters are simulated through well-to-seismic integration based on an initial isochronous geological framework model by utilizing the correlation between high-precision 3D seismic waveform data; coordinate systems are transformed for multiple logging curves after being preprocessed by utilizing the PCA method twice; and dimensionality reduction analysis is carried out on the lithological information and the physical information that are reflected by the data of multiple conventional logging curves, so that a small amount of PCA data has the capability of characterizing the reservoir by multiple logging curves.

In the present invention, the karst cave and the data points of internal filling can be well distinguished by a 2D (Two-Dimensional) cross plot constructed based on the PCA data, so as to obtain a plate of a cross plot of identification for the karst reservoir; and threshold information for division of the reservoir, which is reflected by the plate, is applied to simulated data of the 3D parameters, so as to obtain the characterization conclusion of longitudinal and lateral structures of the karst cave and the internal filling characteristics thereof under the constraint of PCA cross analysis. Therefore, the characterization precision is improved, the reservoir with fast lateral change can be predicted, and the reliable theoretical basis is provided for evaluating the reservoir property and the oil-gas migration of a carbonate paleokarst cave on a large scale.

According to the method and the system of the present invention, the mapping relationship between geophysical detection methods is established by adopting the Markov chain sampling criterion and a Monte Carlo estimation method under the guidance of the Bayesian theory, so as to achieve the effect of identifying the development characteristics of a carbonate paleokarst cave type reservoir in a large-scale complex basin.

BRIEF DESCRIPTION OF DRAWINGS

Other characteristics, purposes and advantages of the present application become more apparent by reading the detailed description for non-restrictive embodiments with reference to the following drawings.

DETAILED DESCRIPTION OF THE EMBODIMENTS

Figure 1:
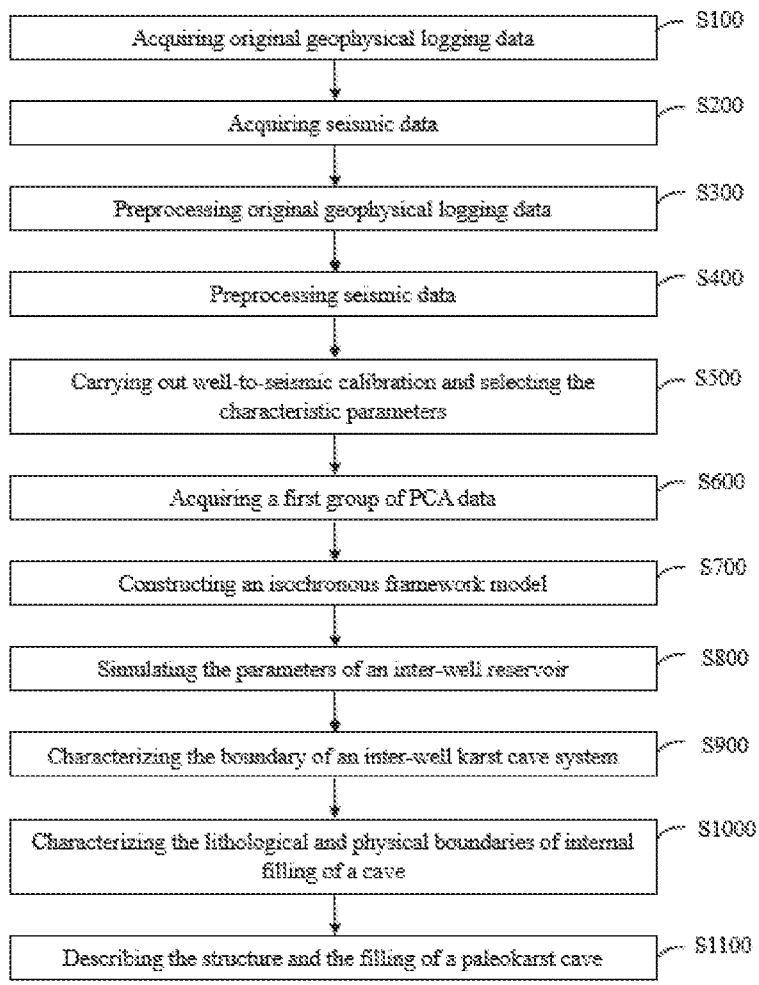
FIG. 1 is a schematic diagram of the flow of embodiments of a method and system for evaluating the filling characteristics of a deep paleokarst reservoir through well-to-seismic integration.

The present application is further described in details hereinafter through combination with the drawings and embodiments. It should be understood that the specific embodiments described here are only used for explaining related inventions, but are not used for limiting the present invention. In addition, it should also be noted that in order to describe the present invention conveniently, only the parts related to the related inventions are shown in the drawings.

It should be noted that the embodiments in the present application and the characteristics in the embodiments can be combined with each other in case of no conflict. The present application is described in details hereinafter with reference to the drawings and through combination with the embodiments.

In the present invention, under the conditions of fully utilizing logging data and seismic data, adopting a machine learning algorithm and taking a wave indication simulation method as a core, sensitive parameters are established by using a PCA algorithm, so that the structure and the filling of a reservoir are precisely identified by the logging data; and then, 3D seismic simulation data bodies are established by using sensitive parameters and 3D seismic data, so that the logging interpretation result with high resolution is extrapolated to the inter-well 3D large-scale area, and the filling characteristics of a deep paleokarst reservoir are evaluated finally.

In order to describe a method for intelligently dividing the filling characteristics for a paleokarst cave type reservoir of the present invention more clearly, all steps in the embodiments of the present invention are described in details hereinafter through combination with FIG. 1.

A method and system for evaluating the filling characteristics of the deep paleokarst reservoir through well-to-seismic integration in a first embodiment of the present invention comprises Step S100-Step S1100, and all the steps are described in details as follows:

The statistical analysis on actual seismic data indicates that the characteristics of the seismic waveforms, which are generated by a paleokarst cave, are usually composed of multiple groups of valleys and peaks. Through researching, it was found that the characteristic reflection was caused by the interference of the seismic wave; and in addition, the amplitude of the reflected wave was related to the combination of fillings of the cave (Yu et al., 2018). Xu et al. (2016) also found that various seismic waveform reflection characteristics were generated by different shapes, thicknesses and combination relationships of paleokarst cave-type target bodies through simulation of a physical model, namely, the characteristics of the reflection morphology were related to the diameter of the cave, the morphology of the cave and the distribution law (Xu et al., 2016). Scholars have further found that in a same phase belt of an isochronous stratigraphic framework, the similarity of the waveform characteristics can represent lithological combination with the certain correlation. Therefore, the isochronous interface partition inversion and the simulation for the characteristic parameters are carried out based on the idea of indication of the waveforms, lateral change information of the seismic waveforms is utilized, and the constraint for a sedimentary environment is better reflected, so as to be more aligned with the sedimentary geology law.

Figure 2:
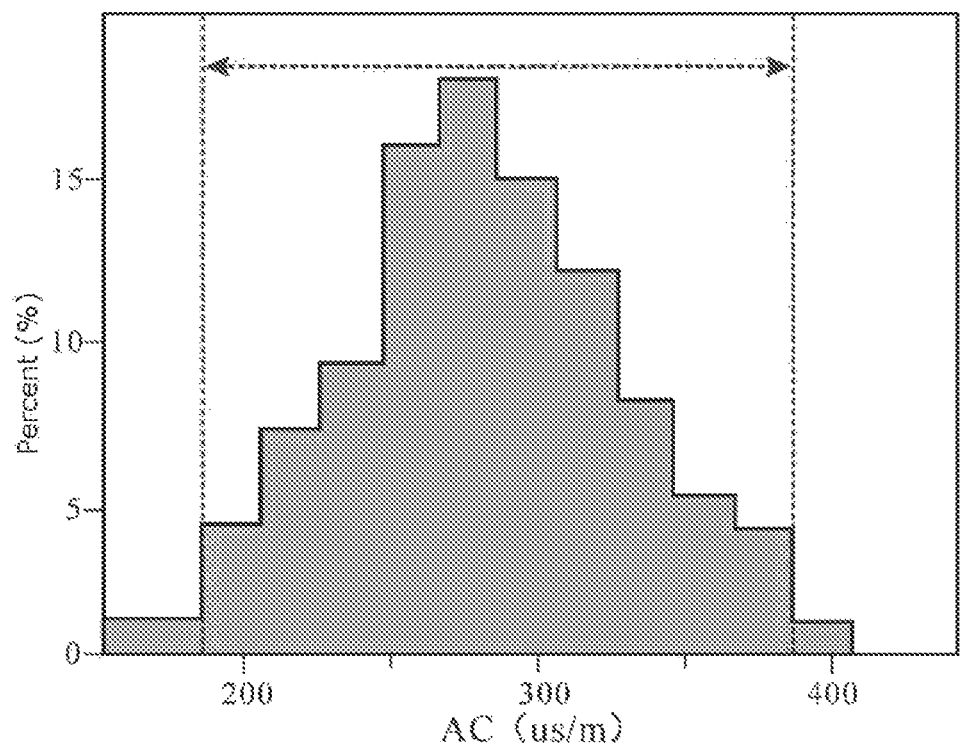
FIG. 2 is a schematic diagram of a logging curve with outliers removed of the present invention.
Figure 3:
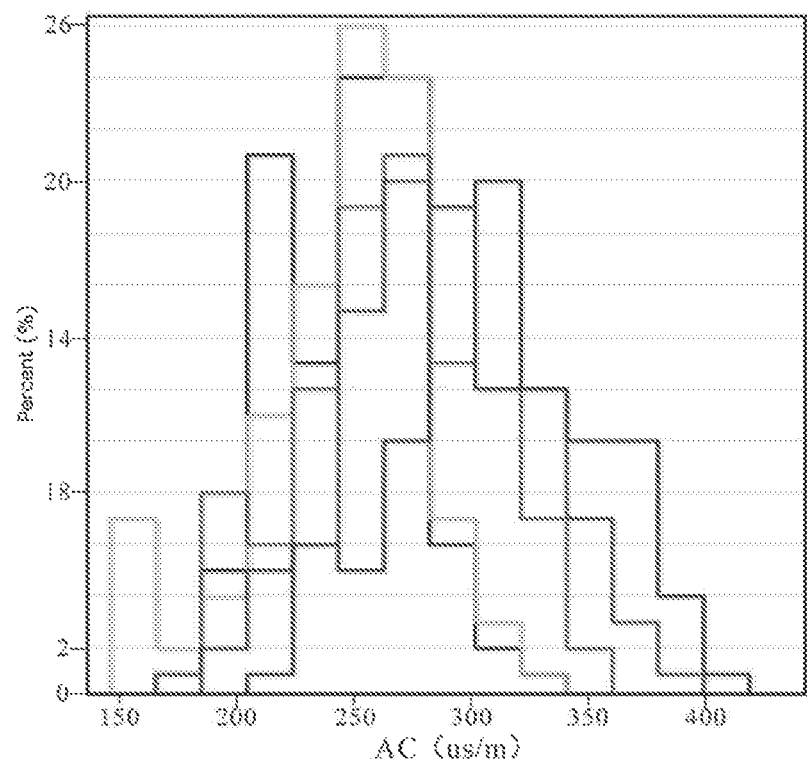
FIG. 3 is a schematic diagram of superposing all curves in the standardization flow of the present invention.

Step S100, acquiring original geophysical logging data: acquiring original logging data of each sample well by logging equipment, comprising: measuring the self-potential SP of each sample well by a measuring electrode, measuring the natural gamma ray GR of each sample well by a natural gamma ray downhole device and a natural gamma ray ground instrument, and acquiring the caliper CAL of each sample well by a caliper arm; and acquiring data of a resistivity curve: deep lateral logging RLLD, shallow lateral logging RLLS and micro-lateral logging RLLM, and data of a physical property characterization curve: compensated neutrons CNL, a compensated acoustic curve AC and a density curve DEN by traditional logging equipment; and acquiring definite lithological information and physical information of an individual depth segment based on imaging logging information, drilling information, mud logging information and rock-core information, so as to determine depth data of a marker bed at a target horizon, wherein the step of measuring the self-potential SP of each sample well by the measuring electrode and measuring the natural gamma ray GR of each sample well by the natural gamma ray downhole device and the natural gamma ray ground instrument specifically comprises:

measuring the self-potential SP of each sample well by the measuring electrode:

arranging a measuring electrode $Q_{electrode}$ on the ground and arranging a measuring electrode $Z_{electrode}$ under the well by a cable;

lifting the measuring electrode $Z_{electrode}$ along the well axis to measure the change of the self-potential with the well depth, wherein a calculation method of the value of the self-potential is shown as follows:

$$E_A = E_d - E_{da} = (K_d - K_{da}) lg \frac{R_{mf}}{R_w} = K_{diffusion} lg \frac{R_{mf}}{R_W}$$

wherein $E_A$ represents the total self-potential; $K_d$ represents the coefficient of diffusion potential; $K_{dd}$ represents the coefficient of diffusion and adsorption potential; $R_{mf}$ represents the value of resistivity of mud filtrate; and $R_W$ represents the value of resistivity of stratum water; and measuring the natural gamma ray GR of each sample well by the natural gamma ray downhole device and the natural gamma ray ground instrument:

wherein the natural gamma ray downhole device comprises a detector, an amplifier and a high-voltage power supply;

acquiring the natural gamma ray by the detector, transforming the natural gamma ray into an electric pulse signal and amplifying the electric pulse signal by the amplifier; and transforming the number of electric pulses formed in each minute into the potential difference and recording the potential difference by the ground instrument;

a dual lateral electrode system is composed of a main electrode, supervision electrodes, ring shielding electrodes and cylindrical electrodes; the main electrode $A_0$ is located in the center, the supervision electrodes $M_1$ and $M'_1$, the supervision electrodes $M_2$ and $M'_2$ and the ring shielding electrodes $A_1$ and $A'_1$ are distributed symmetrically up and down, and the two cylindrical electrodes are additionally arranged at the symmetrical positions of the outer side of the ring shielding electrodes $A_1$ and $A'_1$; two cylindrical electrodes in a deep lateral electrode system are shielding electrodes $A_2$ and $A'_2$, and two cylindrical electrodes in a shallow lateral electrode system are loop electrodes $B_1$ and $B_2$; a comparison electrode N and a loop electrode B of the deep lateral electrode system are installed at the positions far away from the electrode systems; a main electrode $A_0$ of a micro-spherical focusing electrode system is a rectangular sheet electrode; rectangular frame electrodes sequentially arranged outwards are a measuring electrode $M_0$, the auxiliary electrode $A_1$ and the supervision electrodes $M_1$ and $M_2$; the loop electrode B is installed on a shell of an instrument or on a supporting frame of an electrode plate; the change of the potential difference between any supervision electrode and the comparison electrode is measured, namely, the change of the resistivity of a medium is reflected; and the expression of the apparent resistivity is shown as follows:

$$R_a = K \frac{U_{M_1}}{I_0};$$

wherein in the expression, K represents the coefficient of the electrode system, and the coefficients of the electrode systems of deep lateral logging, shallow lateral logging and micro-spherical focusing logging are different; $U_{M_1}$ represents the potential of a supervision electrode M; and $I_0$ represents main current;

the vibration of mass points of a surrounding medium is caused by the vibration of a crystal of a transmitting transducer of a downhole instrument, so as to generate the acoustic wave transmitted to mud and rock strata in the well; receiving transducers R and R2 can be used for receiving the slide wave one after another in the well, and the time difference $\Delta t$ is recorded, so as to measure the velocity of the acoustic wave of a stratum; and the moments that the acoustic wave arrives at a receiving transducer $R_1$ and the receiving transducer $R_2$ are respectively $t_1$ and $t_2$, so the time difference $\Delta t$ that the acoustic wave arrives at the two receiving transducers is calculated by the following formula:

$$\Delta t = \frac{CD}{v_2} - \frac{CE}{v_1}$$

wherein in the formula, $v_1$ represents the sound velocity of the mud, and $v_2$ represents the sound velocity of the stratum;

a density logging instrument comprises a gamma ray source and two detectors for receiving gamma rays, i.e. a long spacing detector and a short spacing detector; the two detectors are installed on a sliding plate and are pushed onto the wall of the well when in logging; an auxiliary electronic circuit is arranged above the downhole instrument; usually, 137Cs is taken as the gamma ray source, the gamma rays emitted by the gamma ray source have medium energy (0.661 MeV), and only Compton scattering and the photoelectric effect can be generated when the gamma rays are used for irradiating a substance; as the density of the stratum is different, the scattering and absorption capacities of gamma-ray photons are different, and the counting rate of the gamma-ray photons received by the detectors is also different; and the counting rate N of the gamma-ray photons with the passing distance of L is known:

$$N = N_0 e^{-\mu L};$$

if only Compton scattering exists, μ represents the Compton scattering absorption coefficient, and the following formula is obtained by transformation:

$$N = N_0 \cdot e^{-C\rho_b \cdot L}$$

wherein in the formula, C represents the constant related to the stratum, and L represents the distance from a receiving source to the gamma ray source;

after the spacing is selected, scales are calibrated for the instrument, and the relationship between $\rho_b$ and N is found, so that the density $\rho_b$ of the stratum can be measured by recording the counting rate N of the scattered gamma-ray photons;

compensated neutron logging is composed of a neutron emission source and two receiving detectors; two counting rates $N_t(r_1)$ and $N_t(r_2)$ are obtained by the counting of the two detectors; and the hydrogen content of the stratum can be reflected by the specific value of the two counting rates:

$$\frac{N_t(r_1)}{N_t(r_2)} = \frac{r_2}{r_1} e^{-(r_1-r_2)/L_s}$$

wherein in the formula, $r_1$ and $r_2$ represent the distance from the two detectors to a neutron source, and $L_s$ represents the slowing-down length, which reflects the hydrogen content of the stratum; and when the caliper is measured, the instrument is moved downwards to the expected depth in the well; the caliper arm is opened by a traditional manner, and then four caliper legs are unfolded outwards under the action of spring force, wherein the included angle between every two of the caliper legs is 90 degrees; the tail ends of the four caliper legs cling to the wall of the well; with upward moving of the instrument, the caliper arm is unfolded or retracted with the change of the caliper and can drive a connecting rod to move up and down; the connecting rod is connected with a sliding end of a potentiometer, and then the change of the caliper can be transformed into the change of the resistance; when current with certain intensity is applied on a movable resistor, the potential difference between a certain fixed end of the movable resistor and the sliding end is changed with the change of resistance value between the certain fixed end and the sliding end; and the size of the caliper is reflected by measuring the potential difference:

$$d = d_0 + c \frac{\Delta U_{MN}}{I}$$

wherein in the formula, $\Delta U_{MN}$ represents the potential difference of a caliper measuring instrument, $d_0$ represents the initial value, and c represents the constant of the instrument;

Step S200, acquiring seismic data: acquiring data of an original seismic wave reflected signal by a seismic wave excitation device and a receiving device and acquiring isochronous 3D distribution of the marker bed at the target horizon according to the waveform of the data of the original seismic wave reflected signal, wherein in the embodiment, the data of nine conventional logging curves in the depth range of 5,500-5,750 m is detected at a borehole in a work area, and the sampling interval is set as 0.01 m; the 3D seismic data of the work area with the area of about 27 km² is obtained by utilizing a 3D seismic detection method and by virtue of a seismic wave excitation source and a seismic signal detector; the two-way travel time of a signal record is 4 s; the time interval of sampling points is 1 ms; and the detection depth is more than 6,000 m;

Step S300, preprocessing original geophysical logging data: drawing data of logging curves based on original logging data of the sample wells and carrying out abnormal value processing and standardization processing, so as to obtain data of standardized logging curves, wherein in the embodiment, Step S300 comprises:

Step S310, drawing data of an original logging curve based on the original logging data;

Step S320, removing outliers to obtain the data of the logging curve with the outliers removed based on the data of the original logging curve, wherein the outliers refer to the unreasonable values existing in a data set; a histogram of parameters of the single curve in all logging data is counted; the interval threshold is reserved by reasonable adjustment to remove the outliers; the front 5% of data which maximally deviates from the median is removed preferably in the embodiment; and a histogram of the logging curve with the outliers removed is shown in FIG. 2;

Step S330, superposing all data of the histogram of the single logging curve at the positions of the sample wells in the work area based on the data of the logging curve with the outliers removed, and integrating the thresholds to obtain the data of the standardized logging curve; and obtaining the data of the standardized logging curve by taking the standardization processing for the compensated acoustic curve AC as an example, wherein due to the difference of the instrument or the influence of other factors, the conventional logging data between different wells is too large or too small on the whole, the curves need to be standardized, and all the curves are superposed, which is shown in FIG. 3;

Step S400, preprocessing the seismic data: obtaining a high-precision 3D seismic amplitude data body by mixed-phase wavelet estimation and maximum posteriori deconvolution and enhancing diffusion filtering based on the data of the seismic wave reflected signal, wherein at present, the 3D seismic network measuring technology with the track pitch of 25 m×25 m is widely applied to the petroleum exploration field, the seismic wave reflected signal is received in the vertical direction at the sampling interval of 2 ms usually, and the total sampling time is within 6 s, so as to detect the geological characteristics of intervals with different depths; the method of the present invention is usually used for detecting a target body with the depth of over 2 m, and the requirement on the dominant frequency of the seismic data is higher, which is within the range of 50-60 Hz; and when the dominant frequency of an amplitude data body of the seismic data in the development interval of the paleokarst cave is lower than 50 Hz, by adopting mixed-phase wavelet estimation and maximum posteriori deconvolution and enhancing diffusion filtering, frequency broadening and noise reduction processing is carried out on the 3D seismic data, so as to obtain a 3D seismic data body with high resolution and high signal-to-noise ratio;

the mixed-phase wavelet estimation and maximum posteriori deconvolution is a data processing method which is used for improving the resolution of the seismic signal by broadening the effective frequency band on the premise of ensuring the seismic data after being processed is higher in fidelity, which is equivalent to Step S410-Step S4100 in the embodiment;

in the embodiment, Step S400 specifically comprises:

Step S410, based on the data of the seismic wave reflected signal, expressing a frequency domain seismic record convolution model as:

$$s(\omega)=\sigma(\omega)\varepsilon(\omega)$$

wherein $s(\omega)$ represents the seismic record after Fourier transformation; $\sigma(\omega)$ represents the wavelet after Fourier transformation; $\varepsilon(\omega)$ represents the frequency spectrum of the reflection coefficient after Fourier transformation; and co represents the angular frequency;

Step S420, transforming logarithms on the two sides of the equation of the frequency domain seismic record convolution model into a linear system to obtain a linear seismic record convolution model:

$$\ln s(\omega)=\ln\sigma(\omega)+\ln\varepsilon(\omega)$$

Figure 4:
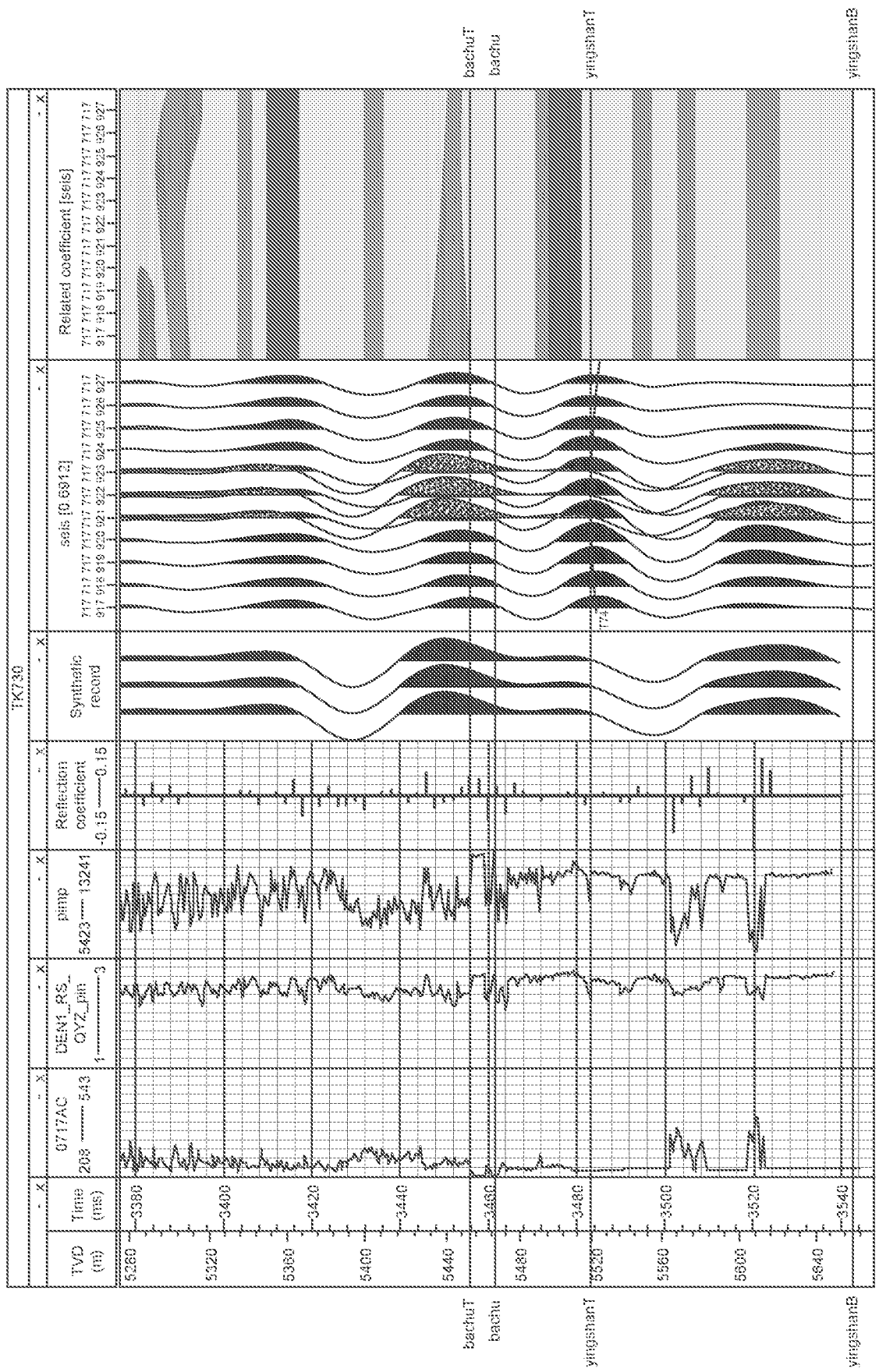
FIG. 4 is a diagram of well-to-seismic calibration for a single well in the embodiment of the present invention.
Figure 5:
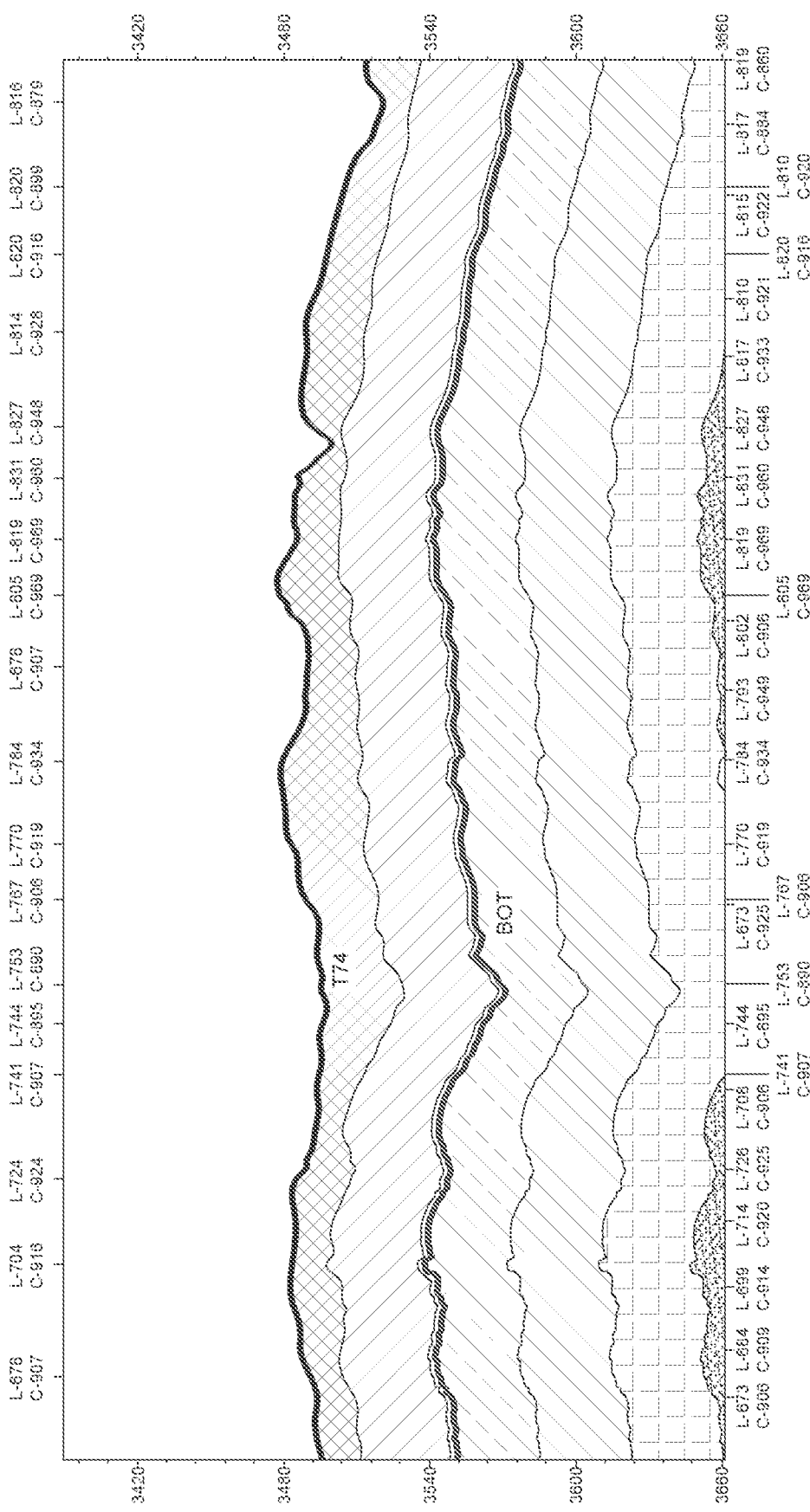
FIG. 5 is a diagram of an isochronous framework model under a T74 marker bed in the embodiment of the present invention.
Figure 6:
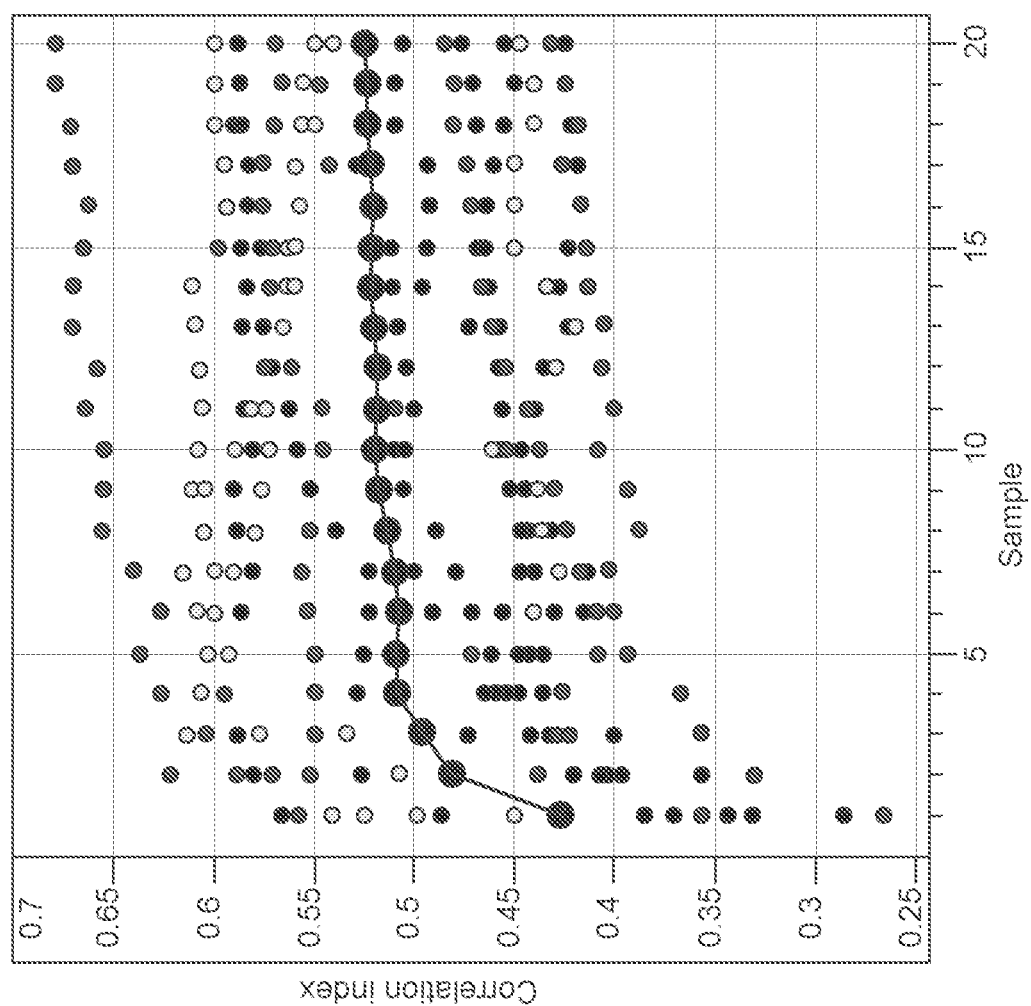
FIG. 6 is a schematic diagram PCA of fitting all correlation curves with the correlation of waveforms of reference wells changing with the parameter of the sample number into an overall correlation curve in the embodiment of the present invention.

Step S430, carrying out inverse Fourier transformation on the linear seismic record convolution model to obtain a complex cepstrum sequence:

$$\tilde{s}(t)=\tilde{\sigma}(t)+\tilde{\varepsilon}(t)$$

wherein $\tilde{s}(t)$ represents a complex cepstrum sequence of seismic waveform record; $\tilde{\sigma}(t)$ represents a complex cepstrum sequence of the seismic wavelet; $\tilde{\varepsilon}(t)$ represents a complex cepstrum sequence of the stratum reflection coefficient; and t represents the time of the seismic waveform record;

Step S440, based on the complex cepstrum sequence, separating the wavelet and the reflection coefficient by a low-pass filter and extracting a wavelet amplitude spectrum, wherein the difference between the smoothness of the wavelet and the reflection coefficient sequence is easily distinguished in the complex cepstrum: the energy of the wavelet appears near the original point, while the reflection coefficient sequence is far away from the original point; and the wavelet and the reflection coefficient in the complex cepstrum can be separated from each other by the low-pass filter, so as to achieve the purpose of extracting the wavelet amplitude spectrum;

Step S450, acquiring a simulated seismic wavelet amplitude spectrum by a least square method:

$$\sigma(f)=A(f)f^{\alpha}e^{H(f)}$$

wherein the fitting parameter $\alpha \geq 0$ of the least square method is a constant; $\sigma(f)$ represents the wavelet amplitude spectrum; $H(f)$ and $A(f)$ represent the polynomials off; and f represents the frequency of the seismic wavelet; and in the embodiment, a calculation method of the simulated seismic wavelet amplitude spectrum comprises:

positioning the maximum value of an amplitude spectrum in the data of the seismic wave reflected signal and the frequency corresponding to the maximum value;

fitting the maximum value of the amplitude spectrum of the seismic signal and the simulated seismic wavelet amplitude spectrum by the least square method to obtain the coefficients of the polynomials of the parameters a and H (f), so as to obtain the fit amplitude value of the corresponding frequency of the maximum value; and dividing the fit amplitude value of the corresponding frequency by the maximum value of the amplitude spectrum of the seismic signal, so as to fit the coefficient of the polynomial A(f) by the quotient;

Step S460, based on the simulated seismic wavelet amplitude spectrum, obtaining the maximum phase component and the minimum phase component of the wavelet, wherein it is assumed that the maximum phase component of the wavelet $\sigma(t_{theo})$ is $u(t_{theo})$, and the minimum phase component of the wavelet $\sigma(t_{theo})$ is $v(t_{theo})$, the wavelet $\sigma(t_{theo})$ is:

$$\sigma(t_{theo})=u(t_{theo}) \cdot v(t_{theo});$$

and the complex cepstrum of the amplitude spectrum is expressed as follows:

$$2\tilde{\sigma}_0(t_{theo})=\tilde{u}(t_{theo})+\tilde{v}(t_{theo})+\tilde{u}(-t_{theo})+\tilde{v}(-t_{theo})$$

wherein the complex cepstrum $\tilde{\sigma}_0(t_{theo})$ of the amplitude spectrum is displayed symmetrically on the positive axis and the negative axis of the complex cepstrum; $\tilde{v}(-t_{theo})$ represents the complex cepstrum of the minimum phase function corresponding to the maximum phase component $v(t_{theo})$ of the seismic wavelet; and $\tilde{u}(-t_{theo})$ represents the complex cepstrum of the maximum phase function corresponding to the minimum phase component $u(t_{theo})$ of the seismic wavelet;

Step S470, based on the complex cepstrum in the amplitude spectrum, determining a group of mixed-phase wavelet sets with the same amplitude spectrum; constantly adjusting the parameters of the Yu wavelet; keeping the low frequency, broadening the high frequency and properly increasing the dominant frequency to construct the expected output wavelet form; and looking for the best balance point for improving the resolution ratio and the fidelity with reference to a signal-to-noise ratio spectrum under the control of the logging curves, so as to obtain data of the waveform after shaping, wherein the wavelet amplitude spectrum is shown in FIG. 4;

after mixed-phase wavelet estimation and maximum posteriori deconvolution, the effective frequency band of the seismic data is broadened, and the high-frequency part is reasonably strengthened; in the aspect of the seismic waveforms, the number of in-phase axes is increased, so that the detailed changes of seismic wave reflection information are reflected easily, and the consistency of the waveform of the same reflection wave group is improved in the aspects of the amplitude, the phase and the frequency; and in the aspect of the seismic response of the paleokarst cave, the 'bead-like' reflection characteristic is particularly obvious, and the details of the internal morphology of strings of beads can be clearly displayed, which represents the seismic reflection of a complex paleokarst cave type reservoir with different structure characteristics and combinations of the fillings, so as be helpful to the fine geological interpretation in the later period;

the diffusion filtering technology was firstly applied to the processing and interpretation for the seismic data by Fhemers and Hocker in 2003; according to the technology, the noise can be effectively suppressed, and the details such as edges, faults, unconformable surfaces, pinch out and the like of a geological body in the seismic data can be reserved as much as possible, so as to provide the reliable seismic data for subsequent seismic interpretation and reservoir prediction and greatly improve the success rate of exploration and development of oil and gas; and in order to achieve the purposes of reducing the seismic noise and enhancing the diffusion filtering effect of the geological structure characteristics, a step of looking for the diffusion tensor is the most critical step of the method:

Step S480, based on the data of the waveform after shaping, constructing a tensor diffusion model:

$$\begin{cases} \frac{\partial U}{\partial \tau} = \text{div}(D \cdot \nabla U) \\ U|_{\tau=0} = U_0 \end{cases}$$

wherein $\tau$ represents the diffusion time; div represents the divergence operator; D represents the diffusion tensor; U represents the diffusion filtering result; $U|_{\tau=0}$ represents the diffusion filtering result when $\tau=0$; $U_0$ represents the data of the waveform after shaping when $\tau=0$; and as the initial condition of the tensor diffusion model, $\nabla U$ represents the gradient of the diffusion filtering result;

based on the tensor diffusion model, constructing the gradient structure tensor:

$$J_\rho(\nabla U) = G_\rho * J_0 = G_\rho * (\nabla U (\nabla U)^T)$$

wherein U represents the diffusion filtering result, and $J_0$ represents the tensor product of the gradient vector;

the Gaussian function with the scale of $\rho$ is expressed by $G_\rho$:

$$G_\rho(r) = (2\pi\rho^2)^{-3/2} \exp(-|r|^2/(2\rho^2))$$

wherein r represents the calculation radius;

the characteristic vector of the structure tensor is:

$$J_\rho(\nabla U) = (v_1\ v_2\ v_3) \begin{pmatrix} \xi_1 & 0 & 0 \\ 0 & \xi_2 & 0 \\ 0 & 0 & \xi_3 \end{pmatrix} (v_1\ v_2\ v_3)^T$$

wherein $v_1$, $v_2$ and $v_3$ represent three characteristic vectors of the gradient structure tensor and can be regarded as a local orthogonal coordinate system; $v_1$ points to the gradient direction of the seismic signal; a plane formed by $v_2$ and $v_3$ is in parallel to the local structure characteristics of the seismic signal; and $\xi_1$, $\xi_2$ and $\xi_3$ represent three characteristic values corresponding to $v_1$, $v_2$ and $v_3$ respectively;

Step S490, based on the characteristic vector of the structure tensor, respectively calculating the confidence degree of a linear structure, the confidence degree of a face structure and the diffusion tensor, wherein the confidence degree $C_{line}$ of the linear structure is:

$$C_{line} = \frac{\lambda_2 - \lambda_3}{\lambda_2 + \lambda_3};$$

the confidence degree $C_{plane}$ of the face structure is:

$$C_{plane} = \frac{\lambda_1 - \lambda_2}{\lambda_1 + \lambda_2};$$

and the diffusion tensor D is:

$$D = (v_1\ v_2\ v_3) \begin{pmatrix} \mu_1 & 0 & 0 \\ 0 & \mu_2 & 0 \\ 0 & 0 & \mu_3 \end{pmatrix} (v_1\ v_2\ v_3)^T = \begin{pmatrix} D_{11} & D_{12} & D_{13} \\ D_{21} & D_{22} & D_{23} \\ D_{31} & D_{32} & D_{33} \end{pmatrix}$$

wherein $\mu_1$, $\mu_2$ and $\mu_3$ represent three non-negative characteristic values of the diffusion tensor and respectively represent the intensity of filtering of the diffusion filter in the three characteristic directions $v_1$, $v_2$ and $v_3$; and Step S4100, repeating the steps S480-S490 until the preset number of iterations is achieved, so as to obtain the diffusion filtering result, i.e. the high-precision 3D seismic amplitude data body, wherein a diffusion filtering algorithm is adopted for reserving the geological characteristics of the paleokarst cave type reservoir of 'bead-like' reflection, and the imaging capability of the seismic data for the target geological body is enhanced; and meanwhile, the effects of suppressing the noise and improving the transverse continuity of the in-phase axes and the signal-to-noise ratio of the seismic signal;

Step S500, carrying out well-to-seismic calibration and selecting characteristic parameters: acquiring a wave impedance curve of each sample well based on the compensated acoustic curve and the density curve DEN in the data of the standardized logging curve, so as to calculate a reflection coefficient curve; acquiring the preferred frequency of the ricker wavelet, so that the preferred frequency is consistent with the dominant frequency of the high-precision 3D seismic amplitude data body; carrying out convolution operation on the ricker wavelet and the reflection coefficient curve, so as to obtain a synthetic seismic record; comparing the depth data of the marker bed at the target horizon and the isochronous 3D distribution of the marker bed at the target horizon for well-to-seismic calibration; calculating the correlation between the synthetic seismic record and the waveform of a near-well seismic channel; when the correlation is more than or equal to a preset first threshold, judging that the result of well-to-seismic calibration is qualified, so as to obtain the time-depth transforming relationship between the data of the logging curve and the seismic record and the characteristic parameters sensitive to the reservoir; and the first threshold is preferably 85%;

wherein a method for obtaining the characteristic parameters sensitive to the reservoir comprises:

drawing a columnar statistical graph of responses of logging parameters, which are generated to different geological bodies near the wells; when the numerical value of data of a certain standardized logging curve can be used for distinguishing data points that are more than a second threshold preset by different logging interpretation conclusions, selecting the data of the standardized logging curve as the characteristic parameters sensitive to the reservoir, wherein the characteristic parameters sensitive to the reservoir at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN; and preferably, the second threshold is 70%;

when a carbonate paleokarst cave type reservoir is looked for, a small karst cave reservoir body with the height of 0.5-5.0 m has the characteristics of wide distribution and large number, which is taken as a key object of reservoir prediction; the characteristics of the wave impedance of seismic reflection and inversion only have a certain response to the reservoir with the depth of above 5 m and cannot be identified with certainty; meanwhile, although conventional logging is characterized by low resistance, low density, increased neutrons and time difference of the acoustic wave, the detection range thereof is limited; and by the well-to-seismic calibration technology, the logging curves are regarded as 'hard data', the 3D seismic waveforms are regarded as 'soft data', and the logging constraint is established for the interpretation for the seismic data of the large-scale reservoir, so that the identification precision of such the reservoir can be greatly improved;

firstly, the logging data and the seismic data are integrated through well-to-seismic calibration, the wave impedance curve is calculated according to the compensated acoustic curve AC and the density curve DEN, and then a reflection coefficient curve is calculated; the ricker wavelet is constructed according to the seismic dominant frequency of an interval of interest; the seismic record is synthesized; the synthetic record is compared with the near-well seismic channel from the two aspects of the position of the marker bed and the in-phase axes of seismic reflection; and the time-depth transforming relationship is finally obtained by quality control for the related coefficient between the synthetic record and the near-well seismic channel;

in the embodiment, the synthetic seismic record is obtained by using the 25 Hz (the dominant frequency of the seismic data of the target interval) of ricker wavelet according to wave impedance information calculated by the compensated acoustic curve and the density curve;

a marker bed at the top boundary of an eagle mountain group is determined by observing seismic waveform data; compared with a mudstone bed of an overlying Bachu group, the reflection of the waveforms at a screen area in carbonate rocks is irregular and has uncertain direction, the amplitude can be strong or weak, and in-phase axes can be long or short and are poor in continuity; and the phenomena of termination and bifurcation of reflection of the non-systematic in-phase axes exist;

in the embodiment, the time-depth transforming relationship between the data of the logging curve and the seismic record is:

$$T = T_{H_0} + 2\sum_{i=1}^{n} T_i \cdot \Delta H$$

wherein $T_{H_0}$ represents the time of the seismic signal corresponding to the initial depth of acoustic logging; $T_i$ represents the time difference of the acoustic wave; $\Delta H$ represents the sampling interval of the data of the logging curve; and T represents the two-way travel time of the seismic wave;

a diagram of well-to-seismic calibration for a single well is shown in FIG. 5; and the position of the paleokarst cave of the interval of interest is determined according to drilling data, mud logging data and rock-core data; the type of the reservoir is divided into a sedimentation filled reservoir, a collapse filled reservoir, a chemically filled reservoir and a mixed filled reservoir according to the relationship between the lithology and the combination of the fillings; the parameters of the logging curves sensitive to the type of the reservoir are divided preferably by applying the statistical manners of the histogram and a cross plot of the logging curves; for example, the wave impedance curves can reflect the difference of the physical properties of a rock and can be used for distinguishing the paleokarst cave and a surrounding rock; and a natural gamma ray curve can be used for effectively distinguishing the fillings of a sedimentary sand-mudstone reservoir by utilizing the radioactive characteristics of the geological bodies;

Step S600, acquiring a first group of PCA data: optimizing the data of the standardized logging curves from the characteristic parameters sensitive to the reservoir, wherein the number of pieces of the data is preset; and analyzing the characteristic parameters sensitive to the reservoir by a PCA method, so as to obtain the first group of PCA data sensitive to the reservoir, wherein in the embodiment, the PCA method specifically comprises:

in the embodiment, optimizing the wave impedance curve, a compensated neutron curve, a deep lateral resistivity curve, a shallow lateral resistivity curve and the natural gamma ray curve for carrying out the PCA method on five pieces of logging characteristic parameters sensitive to the classification of the reservoir;

Step B100, calculating the average value of the samples:

$$\bar{x} = \frac{1}{N}\sum_{i=1}^{N} x_i$$

wherein N represents the total sample number of the curve; i represents the parameter of the sample number, $x_i$ represents the $i^{th}$ data of the characteristic parameters of the sample, and $\bar{x}$ represents the average value of the samples; and different logging curves reflect different physical parameters of the geological bodies; and as the detection methods of various logging curves are different, the influence of the dimension thereof on data analysis cannot be neglected;

Step B200, normalizing each parameter curve to obtain the normalized data $x_S$ of the characteristic parameters of the sample:

$$x_S = \frac{x - \bar{x}}{N}$$

wherein x represents the data of sampling points of the characteristic parameters of the sample;

Step B300, based on the normalized data $x_S$ of the characteristic parameters of the samples, calculating the covariance Cov(X, Y) of the characteristic parameters of the samples:

$$\mathrm{Cov}(X, Y) = E[(X - E(X))(Y - E(Y))] = \frac{1}{N-1}\sum_{c=1}^{N}(x_c - \bar{x})(y_c - \bar{y})$$

wherein $x_c$ represents the $c^{th}$ data of the characteristic parameters of an X sample, and $y_c$ represents the $c^{th}$ data of the characteristic parameters of a Y sample;

Step B400, based on the covariance of the characteristic parameters of the samples, constructing a covariance matrix:

$$\mathrm{Cov}(X, Y, Z) = \begin{bmatrix} \mathrm{Cov}(X, X) & \mathrm{Cov}(X, Y) & \mathrm{Cov}(X, Z) \\ \mathrm{Cov}(Y, X) & \mathrm{Cov}(Y, Y) & \mathrm{Cov}(Y, Z) \\ \mathrm{Cov}(Z, X) & \mathrm{Cov}(Z, Y) & \mathrm{Cov}(Z, Z) \end{bmatrix}$$

wherein Z represents the data of the characteristic parameters of the sample, and the covariance matrix comprising p types of data of the characteristic parameters of the samples is:

$$Cov(K) = \begin{bmatrix} Cov(K_{1,1}) & \cdots & Cov(K_{1,p}) \\ \vdots & \ddots & \vdots \\ Cov(K_{p,1}) & \cdots & Cov(K_{p,p}) \end{bmatrix}$$

wherein K represents the multiple data of the characteristic parameters of the samples, $Cov(K_{1,p})$ represents the covariance of first data of the characteristic parameters of the sample and $p^{th}$ data of the characteristic parameters of the sample, and K does not have specific numerical meaning;

Step B500, based on the covariance matrix comprising p types of data of the characteristic parameters of the samples, acquiring the characteristic values $\hat{\lambda}_1, \hat{\lambda}_2, \ldots, \hat{\lambda}_p$ and p characteristic vectors $\hat{e}_1, \hat{e}_2, \ldots \hat{e}_p$ of the covariance matrix; and based on the characteristic values and the characteristic vectors, calculating the PCA data comprising p types of characteristic values:

$$m_j = \sum_{j=1}^{p} \hat{e}_J n_j$$

wherein $m_j$ represents a $j^{th}$ vector of the PCA data; $n_j$ represents a $j^{th}$ vector of the data of the characteristic parameters of the sample; $\hat{e}_j$ represents a $j^{th}$ characteristic vector of the data of the characteristic parameters of the sample; and j meets the condition: $j \in 1, 2, \ldots p$ and represents the counting parameter; and Step B600, based on the PCA data comprising p types of characteristic values, sorting the corresponding characteristic values from large to small, so as to obtain the characteristic values $\hat{\lambda}_1, \hat{\lambda}_2, \ldots, \hat{\lambda}_p$ sorted from large to small, and calculating the accumulative contribution of the covariance:

$$C_k = \sum_{j=1}^{k} \frac{\lambda_j}{\Sigma_j^p \lambda_j}$$

wherein $\lambda_j$ represents the $j^{th}$ characteristic value sorted from large to small, $C_k$ represents the accumulative contribution of the front k covariance, and k meets the condition: $k \in 1, 2, \ldots, p$; and when k is constantly increased from 1, selecting the vector of the PCA data, which corresponds to the corresponding front k covariance when $C_k$ is more than the third threshold for the first time, i.e. the PCA data obtained by the PCA method, wherein in the embodiment, the third threshold is 85% preferably; the PCA data corresponding to the front k characteristic parameters reflects part of information of $C_k$ for characterizing all parameters of the reservoir; and the preferred PCA data can be used for further analyzing the lithology and the physical property of the reservoir by utilizing the PCA data;

in the embodiment, the five characteristic parameters of logging samples are preferably analyzed by the PCA method, so as to obtain five pieces of PCA data; the variance contribution rates of PC1 and PC2 reach over 85%, the variance contribution rate of PC1 accounts for 48.72%, and the variance contribution rate of PC2 accounts for 36.96%, which can represent various logging response characteristics of the reservoir; and in the embodiment, PC1 and PC2 that are obtained by the PCA method in the first round are:

$PC1=0.3859N_{GR}-0.6446N_{RLLD}+0.3431N_{RLLS}-0.3772N_{CNL}+0.4190N_{IMP}$ $PC2=0.1425N_{GR}+0.6721N_{RLLD}+0.1674N_{RLLS}-0.0687N_{CNL}+0.7037N_{IMP}$, wherein PC1 represents first data in the first group of PCA data obtained by carrying out the PCA method on all the characteristic parameter curves of the data points for the first time; PC2 represents second data in the first group of PCA data obtained by carrying out the PCA method on all the characteristic parameter curves of the data points for the first time; $N_{GR}$ represents the natural GR values of all the data points; $N_{RLLD}$ represents the deep lateral resistivity values of all the data points; $N_{RLLS}$ represents the shallow lateral resistivity values of all the data points; $N_{CNL}$ represents the compensated neutron values of all the data points; and $N_{IMP}$ represents the wave impedance values of all the data points;

Step S700, constructing an isochronous framework model: constructing the isochronous framework model based on the law of sedimentary strata reflected by the high-precision 3D seismic amplitude data body and the time-depth transforming relationship, wherein after the position of the target interval is determined, an interface with the continuous in-phase axes and the stable sedimentary environment or a top or bottom interface with the marker bed as the range to be predicted is selected according to a cross-section diagram of the seismic data; and the isochronous framework model is constructed based on the background of the actual geological structure and the time-depth transforming relationship;

Step S800, simulating parameters of an inter-well reservoir: based on the first group of PCA data of each sample well, determining the parameter of the optimal sample number, which can reflect the overall geological condition; selecting the first group of PCA data of the sample wells to construct an initial model, wherein the first group of PCA data has the highest correlation of the seismic waveforms, and the number of pieces of first group of PCA data is equal to the parameter of the optimal sample number; constantly correcting the parameters of the initial model; and outputting a first group of high-precision characteristic value simulation result data bodies, wherein the first group of high-precision characteristic value simulation result data bodies are data bodies corresponding to the first group of PCA data one to one; and In the embodiment, Step S800 specifically comprises Step S810-Step S890:

Step S810, optionally selecting a sample well as a reference target well and setting the parameter of the initial sample number as 1;

Step S820, according to the principle of similarity of the waveforms, selecting the first group of PCA data of the sample wells and a first group of PCA data of the reference target well for correlation analysis, so as to obtain the correlation value of the parameter of the sample number and the first group of PCA data of the reference target well, wherein the number of pieces of first group of PCA data of the sample wells is equal to the parameter of the sample number;

Step S830, increasing the parameter of the sample number 1 by 1; repeating the method of Step S820 to obtain the correlation value of the parameter of the sample number and the first group of PCA data of the reference target well, which corresponds to each parameter of the sample number; and connecting all the correlation values of the parameter of the sample number and the first group of PCA data of the reference target well, so as to obtain a correlation curve with the correlation of the first group of PCA data of the reference well changing with the parameter of the sample number;

Step S840, selecting another sample well as a reference target well; repeating the methods of Step S810-Step S830 to obtain multiple correlation curves with the correlation of the first group of PCA data of the reference well changing with the parameter of the sample number; fitting all the correlation curves with the correlation of the waveforms of the first group of PCA data of the reference well changing with the parameter of the sample number into an overall correlation curve; selecting an inflection point capable of enabling the correlation in the overall correlation curve to be increased with the increase of the parameter of the sample number and to be finally kept at a stable position; and determining the parameter of the optimal sample number, wherein the effect of fitting all the correlation curves with the correlation of the waveforms of the first group of PCA data of the reference well changing with the parameter of the sample number into the overall correlation curve is shown in FIG. 6;

in the embodiment, the wells with the similar low-frequency structure are preferred as space estimation samples by utilizing double variants of the similarity of the waveforms and the spatial distance in the sample wells, so that the low-frequency change of the spatial structure can be better reflected; and two wells with similar seismic waveforms indicates that the sedimentary environment, in which the two wells are located, is similar, low-frequency compositions of the two wells are similar, and the certainty of the inversion result in the low-frequency band is enhanced; and meanwhile, the data range of the high frequency is restricted, and the reliability of the inversion result and the simulation result is improved;

Step S850, based on the high-precision 3D seismic amplitude data body and the isochronous framework model, calculating the correlations of the waveforms of point positions to be detected and the positions of the sample wells; sorting the correlations of the waveforms from large to small; selecting the first group of PCA data of the sample wells, wherein the first group of PCA data has the highest correlation of the seismic waveforms, and the number of pieces of first group of PCA data is equal to the parameter of the optimal sample number; and based on the sample wells corresponding to the characteristic data of the seismic waveforms of the sample wells having the highest correlation, constructing the initial model by an inter-well characteristic parameter interpolation manner;

Step S860, based on the initial model, selecting the first group of PCA data of the sample wells as prior information, wherein the first group of PCA data has the highest correlation of the seismic waveforms, and the number of pieces of first group of PCA data is equal to the parameter of the optimal sample number;

Step S870, carrying out matched filtering on the initial model and the prior information, so as to obtain the maximum likelihood function;

Step S880, based on the maximum likelihood function and the prior information, solving the statistical distribution density of the posterior probabilities under a Bayesian framework, and sampling the statistical distribution density of the posterior probabilities to obtain the objective function, wherein in the embodiment, Step S880 specifically comprises:

Step S881, by utilizing the law that the white noise meets Gaussian distribution, expressing the parameter of the high-precision characteristic value simulation result data bodies as:

$$Y_{sim}=X_{sim}+N_{noise}$$

wherein $Y_{sim}$ represents the parameter of the high-precision characteristic value simulation result data bodies, $X_{sim}$ represents the to-be-solved actual characteristic parameter value of the subsurface stratum, and $N_{noise}$ represents the random noise;

Step S882, as $\|X_{sim}-X_p\|^2$ also meets Gaussian distribution, determining the initial objective function as:

$$J_1 = \frac{\|X_{sim} - X_p\|^2}{2\sigma^2}$$

wherein $J_1$ represents the function related to posterior information; $X_p$ represents the expected value of the characteristic parameter, which is obtained by calculation after the steps of selecting the sample wells based on the optimal sample number, carrying out matched filtering on characteristic curves of the sample wells and then solving the statistical distribution density of the posterior probabilities; and a represents the covariance of the white noise; and Step S883, based on the initial objective function, introducing the prior information into the objective function by maximum posterior estimation, so as to obtain the following stable objective function:

$$J(Z_{sim})=J_1(Z_{sim})+\lambda_2 J_2(Z_{sim})$$

wherein $Z_{sim}$ represents the characteristic parameter to be simulated; $J_2$ represents the function related to the prior information of the geological data and the logging data; and λ represents the smoothing parameter used for coordinating the mutual effect between $J_1$ and $J_2$.

Step S890, sampling the distribution of the posterior probabilities by an MCMC (Markov Chain Monte Carlo) method and the criterion for Metropolis-Hastings sampling and by taking the objective function as the input of the initial model; constantly optimizing the parameters of the initial model; selecting the solution when the maximum value is selected for the objective function as random implementation; selecting the average value of multiple random implementations as the expected output value; and taking the expected output value as the high-precision characteristic value simulation result data bodies, wherein the parameters in the high-precision characteristic value simulation result data bodies correspond to the characteristic parameters corresponding to the first group of PCA data one to one.

Figure 7:
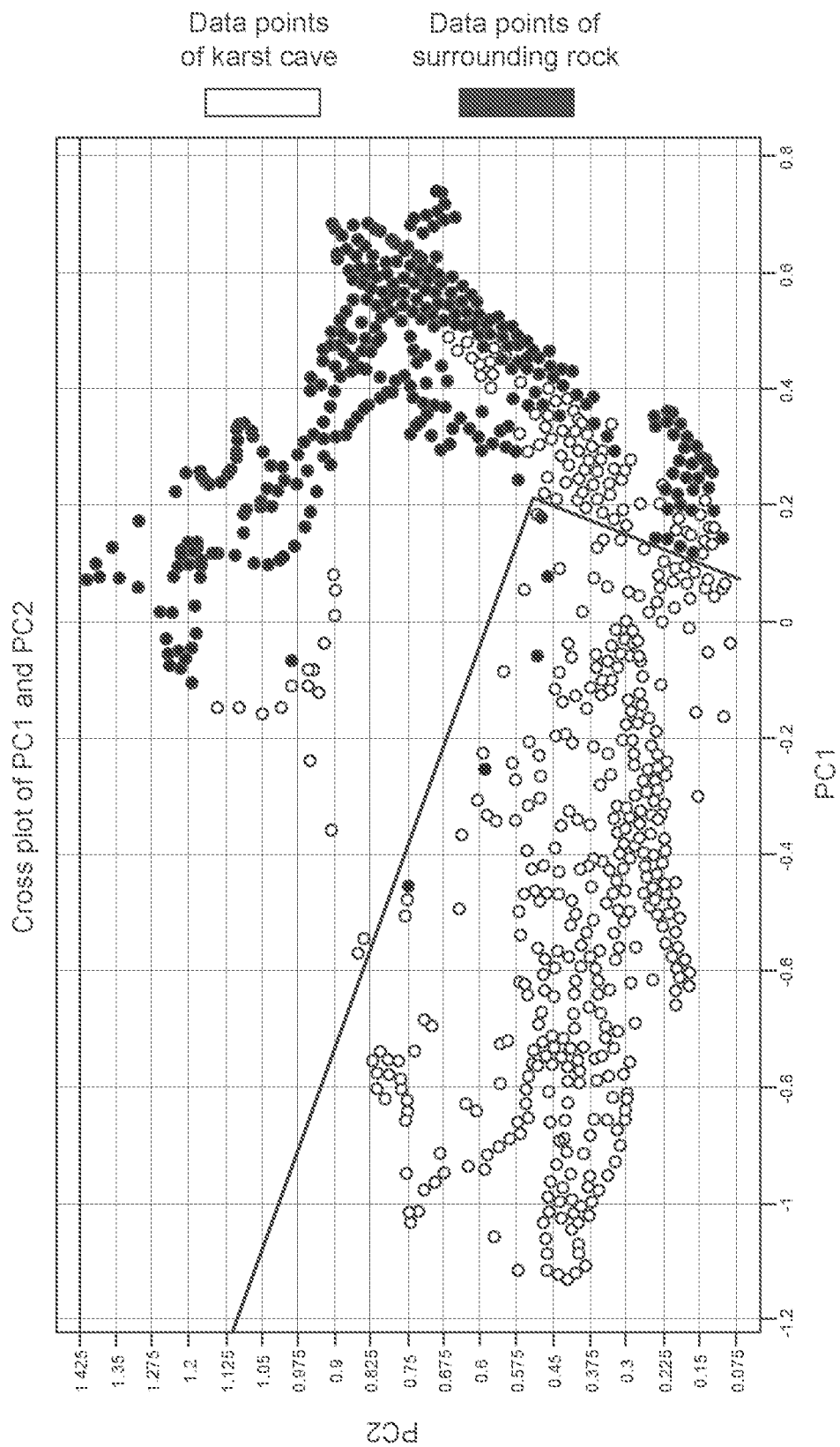
FIG. 7 is a schematic diagram of carrying out cross analysis on a first group of PCA data for capturing data points of a karst cave and carrying out box selection on the threshold in the embodiment of the present invention.
Figure 8:
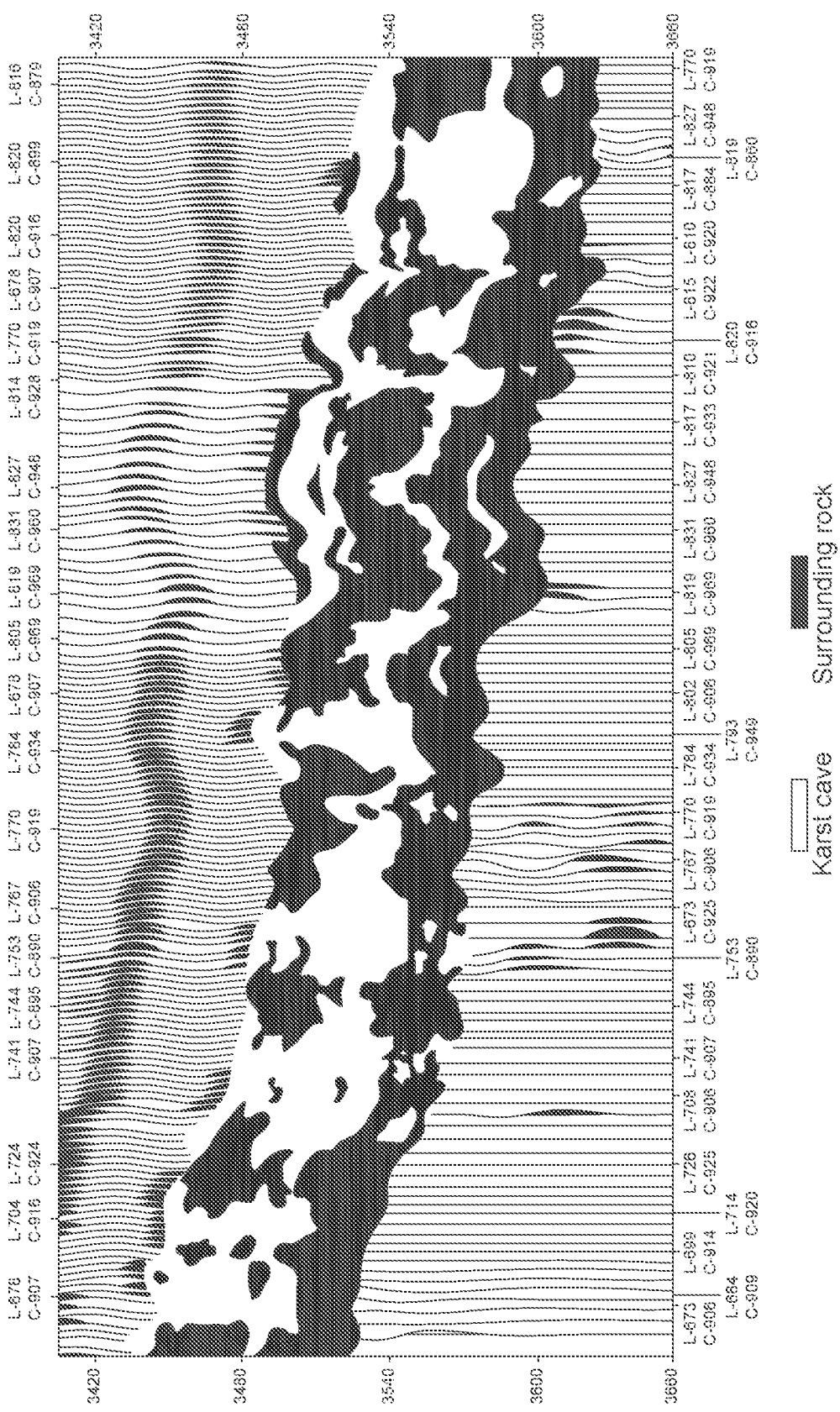
FIG. 8 is a cross-section diagram of characterizing the 3D distribution and the structure of a paleokarst cave in the embodiment of the present invention.
Figure 9:
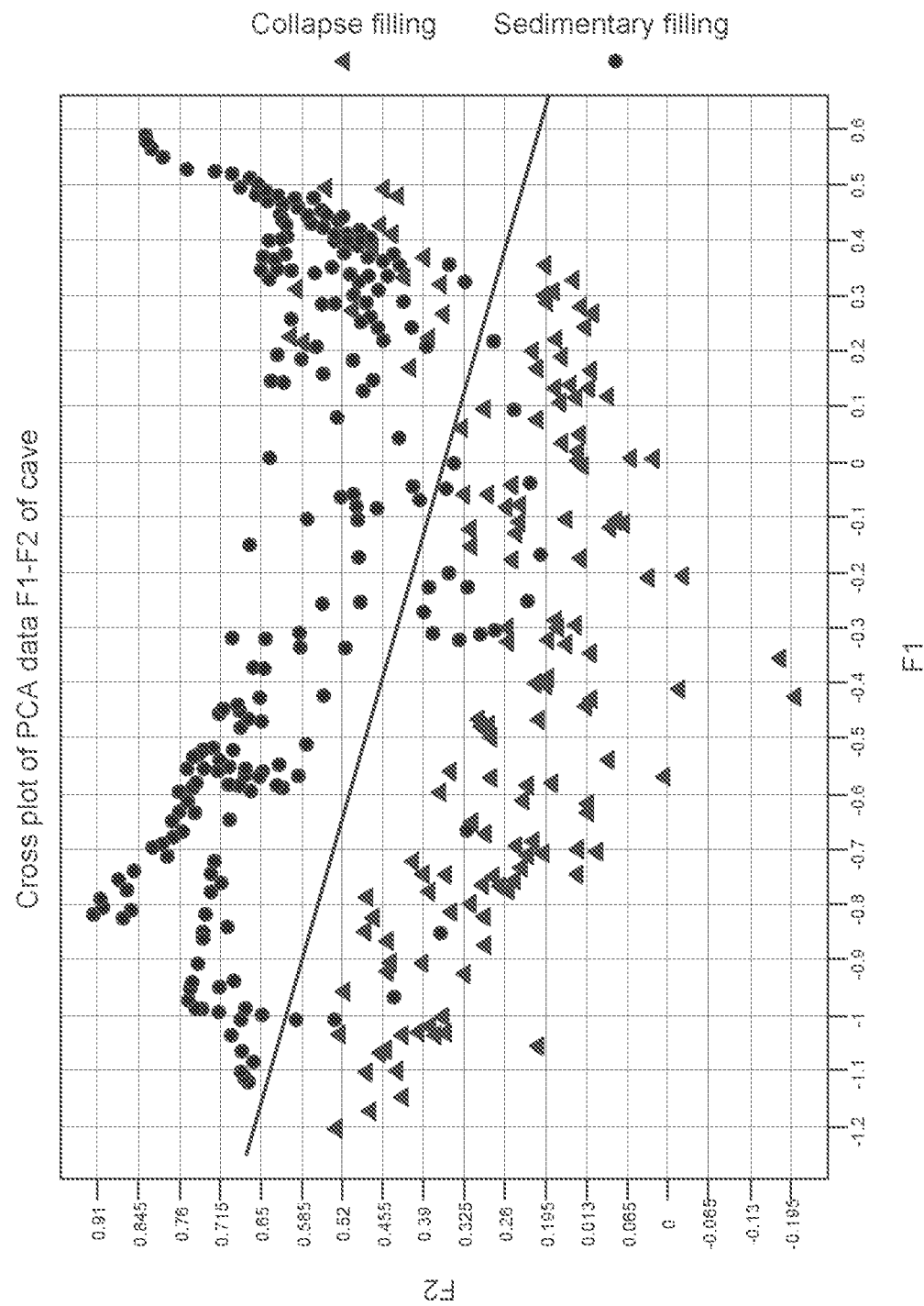
FIG. 9 is a schematic diagram of carrying out cross analysis on a second group of PCA data for dividing internal fillings of the karst cave and carrying out box selection on the threshold in the embodiment of the present invention.
Figure 10:
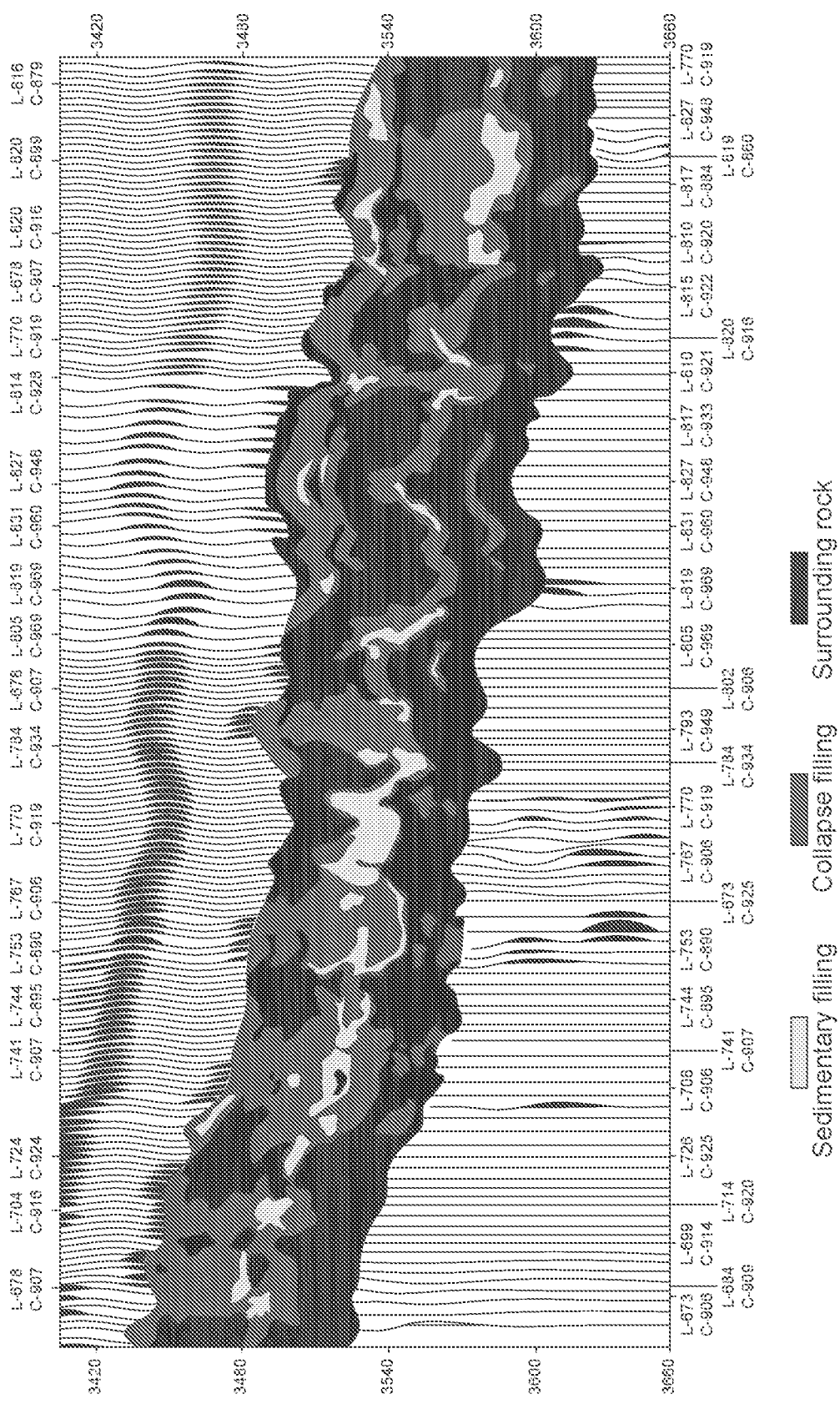
FIG. 10 is a cross-section diagram of characterizing the development characteristics of the internal fillings of the paleokarst cave in the embodiment of the present invention.

Step S900, characterizing the boundary of an inter-well karst cave system: carrying out cross analysis based on the first group of PCA data of the sample wells, so as to obtain a distribution diagram of a first group of discrete data points of various geological bodies;

based on the lithological information and the physical information, acquiring the interpretation conclusion of the distribution diagram of the first group of discrete data points of various geological bodies, dividing a karst cave and a surrounding rock to construct a cross plot of the first group of PCA data, and acquiring the threshold of the first group of PCA data, which is required for division of the karst cave;

in the embodiment, carrying out cross analysis on PC1 and PC2 of the PCA data to obtain the distribution of the discrete data points of various geological bodies; according to the definite lithological information and physical information of the individual depth segment, which are obtained based on imaging logging data, drilling data, mud logging data and rock-core data; obtaining the interpretation conclusion of the cross plot of preferred PCA data; distinguishing the karst cave and the surrounding rock; constructing a plate of the cross plot of the preferred PCA data; and acquiring the thresholds of the PC1 data and the PC2 data, which are required for division of the karst cave, wherein a schematic diagram of carrying out cross analysis on the first group of PCA data for capturing the data points of the karst cave and carrying out box selection on the threshold is shown in FIG. 7; and based on the threshold of the first group of PCA data, carrying out cross analysis on the first group of high-precision characteristic value simulation result data bodies, so as to obtain the characteristics of the 3D spatial morphologies of the karst cave, wherein the structure characteristics and the spatial distribution law of the paleokarst cave type reservoir with the depth of over 2 m can be obtained, and the effect of a cross-section diagram of characterizing the 3D spatial morphologies and the structure is shown in FIG. 8;

Step S1000, characterizing the lithological and physical boundaries of internal filling of the cave: analyzing the characteristic parameters sensitive to the reservoir, which correspond to data points of the karst cave, by the PCA method, so as to obtain a second group of PCA data sensitive to the response of the fillings;

based on the second group of PCA data, generating a second group of high-precision characteristic value simulation result data bodies by the method described in Step S800;

based on the second group of PCA data sensitive to the response of the fillings, carrying out cross analysis to obtain a distribution diagram of a second group of discrete data points of various geological bodies;

based on the lithological information and the physical information, acquiring the interpretation conclusion of the second group of discrete data points of various geological bodies, and distinguishing the types of the fillings to construct a cross plot of the second group of PCA data, so as to obtain the threshold of the second group of PCA data, which is required for division of the types of the internal fillings of the karst cave; and based on the threshold of the second group of PCA data, carrying out cross analysis on the second group of high-precision characteristic value simulation result data bodies, so as to obtain the characteristics of the 3D spatial morphologies of different types of internal fillings of the karst cave, wherein a schematic diagram of carrying out cross analysis on the second group of PCA data for dividing the internal fillings of the karst cave and carrying out box selection on the threshold is shown in FIG. 9;

in the embodiment, extracting interpretation data points of the karst cave, which are obtained according to the plate of the cross plot of PC1 and PC2 of the PCA data and carrying out the PCA method on the five characteristic parameter curves corresponding to the interpretation data points again, so as to obtain the second group of PCA data F1 and F2 sensitive to the response of the fillings; carrying out cross analysis on the PCA data F1 and F2 to obtain the distribution of the discrete data points of various geological bodies; according to the definite lithological information and physical information of the individual depth segment, which are obtained based on the imaging logging data, the drilling data, the mud logging data and the rock-core data; obtaining the interpretation conclusion of a cross plot of the second group of PCA data; distinguishing sedimentary filling and collapse filling; constructing a plate of the cross plot of the second group of PCA data; and acquiring the thresholds of the F1 data and the F2 data, which are required for division of the sedimentary filling and the collapse filling in the karst cave, wherein in the embodiment, the F1 data and the F2 data that are obtained by the PCA method in the second round are:

$F1=0.5574N_{GR}-0.4820N_{RLLD}+0.3972N_{RLLS}-0.4557N_{CNL}+0.3026N_{IMP}$ $F2=-0.4732N_{GR}-0.4627N_{RLLD}+0.1363N_{RLLS}-0.4280N_{CNL}+0.6002N_{IMP}$ wherein F1 represents first PCA data in the second group of PCA data obtained by carrying out the PCA method on all the characteristic parameter curves of characterization data points of the cave for the first time; F2 represents second data in the second group of PCA data obtained by carrying out the PCA method on all the characteristic parameter curves of the characterization data points of the cave for the first time; $N_{GR}$ represents the natural GR values of the characterization data points of the cave; $N_{RLLD}$ represents the deep lateral resistivity values of the characterization data points of the cave; $N_{RLLS}$ represents the shallow lateral resistivity values of the characterization data points of the cave; $N_{CNL}$ represents the compensated neutron values of the characterization data points of the cave; and $N_{IMP}$ represents the wave impedance values of the characterization data points of the cave; and carrying out cross analysis on a second group of PCA data simulation result data bodies by the interpretation conclusion threshold for dividing the sedimentary filling and the collapse filling in the karst cave, so as to obtain the characteristics of the 3D spatial morphologies of the sedimentary filling and the collapse filling in the karst cave; and Step S1100, describing the structure and the filling of the paleokarst cave: based on the characteristics of the 3D spatial morphologies of the karst cave and the characteristics of the 3D spatial morphologies of different types of internal fillings of the karst cave, engraving the spatial distribution of the paleokarst cave and the development characteristics of the internal filling adopting different types of internal fillings by adopting a lithology shielding technology and a 3D engraving technology, wherein a cross-section diagram of characterizing the development characteristics of the internal fillings of the paleokarst cave is shown in FIG. 10.

A system for evaluating the filling characteristics of the deep paleokarst reservoir through well-to-seismic integration in a second embodiment of the present invention comprises: an original geophysical logging data acquisition module, a seismic data acquisition module, an original geophysical logging data preprocessing module, a seismic data preprocessing module, a well-to-seismic calibration and characteristic parameter selection module, a module for acquiring the first group of PCA data, an isochronous framework model constructing module, an inter-well reservoir parameter simulation module, a module for characterizing the boundary of the inter-well karst cave system, a module for characterizing the lithological and physical boundaries of internal filling of the karst cave and a module for describing the structure and the filling of the paleokarst cave;

the original geophysical logging data acquisition module is configured to acquire the original logging data of each sample well by the logging equipment, comprising: measuring the self-potential SP of each sample well by the measuring electrode, measuring the natural gamma ray GR of each sample well by the natural gamma ray downhole device and the natural gamma ray ground instrument, and also acquiring the caliper CAL of each sample well by the caliper arm; and acquiring the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN by the traditional logging equipment; and acquiring the definite lithological information and physical information of the individual depth segment based on the imaging logging information, the drilling information, the mud logging information and the rock-core information, so as to determine the depth data of the marker bed at the target horizon;

the original geophysical logging data preprocessing module is configured to draw the data of the logging curves based on the original logging data of the sample wells and carry out abnormal value processing and standardization processing, so as to obtain the data of the standardized logging curves;

the seismic data preprocessing module is configured to obtain the high-precision 3D seismic amplitude data body by mixed-phase wavelet estimation and maximum posteriori deconvolution and enhancing diffusion filtering based on the data of the seismic wave reflected signal, wherein in the embodiment, based on the relationship between the coordinate of the borehole and the coordinate of the seismic signal detector, the one-to-one correspondence between the seismic waveforms of the borehole and the near-well seismic channel is determined, so as to determine the flat positions of the nine logging curves and the seismic waveforms of the near-well seismic channels corresponding to the flat positions;

the well-to-seismic calibration and characteristic parameter selection module is configured to carry out well-to-seismic calibration and characteristic parameter selection: acquiring the wave impedance curve of each sample well based on the compensated acoustic curve and the density curve DEN in the data of the standardized logging curve, so as to calculate the reflection coefficient curve; acquiring the preferred frequency of the ricker wavelet, so that the preferred frequency is consistent with the dominant frequency of the high-precision 3D seismic amplitude data body; carrying out convolution operation on the ricker wavelet and the reflection coefficient curve, so as to obtain the synthetic seismic record; comparing the depth data of the marker bed at the target horizon and the isochronous 3D distribution of the marker bed at the target horizon for well-to-seismic calibration; calculating the correlation between the synthetic seismic record and the waveform of the near-well seismic channel; and when the correlation is more than or equal to the preset first threshold, judging that the result of well-to-seismic calibration is qualified, so as to obtain the time-depth transforming relationship between the data of the logging curve and the seismic record and the characteristic parameters sensitive to the reservoir, wherein the method for obtaining the characteristic parameters sensitive to the reservoir comprises:

drawing the columnar statistical graph of the responses of logging parameters, which are generated to the different geological bodies near the wells; and when the data of the certain standardized logging curve can be used for distinguishing the data points that are more than the second threshold preset by the different logging interpretation conclusions, selecting the data of the standardized logging curve as the characteristic parameters sensitive to the reservoir, wherein the characteristic parameters sensitive to the reservoir at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;

the module for acquiring the first group of PCA data is configured to optimize the data of the standardized logging curves from the characteristic parameters sensitive to the reservoir, wherein the number of pieces of the data is preset; and carry out dimensionality reduction on the characteristic parameters sensitive to the reservoir by the PCA method, so as to obtain the first group of PCA data;

the isochronous framework model constructing module is configured to construct the isochronous framework model based on the law of sedimentary strata reflected by the high-precision 3D seismic amplitude data body and the time-depth transforming relationship;

the inter-well reservoir parameter simulation module is configured to determine the parameter of the optimal sample number, which can reflect the overall geological condition, based on the first group of PCA data of each sample well; select the first group of PCA data of the sample wells to construct the initial model, wherein the first group of PCA data has the highest correlation of the seismic waveforms, and the number of pieces of PCA data is equal to the parameter of the optimal sample number; constantly correct the parameters of the initial model; and output the first group of high-precision characteristic value simulation result data bodies, wherein the first group of high-precision characteristic value simulation result data bodies is the data bodies corresponding to the first group of PCA data one to one;

the module for characterizing the boundary of the inter-well karst cave system is configured to carry out cross analysis based on the first group of PCA data of the sample wells, so as to obtain the distribution diagram of the first group of discrete data points of various geological bodies;

based on the lithological information and the physical information, acquire the interpretation conclusion of the distribution diagram of the first group of discrete data points of various geological bodies, divide the karst cave and the surrounding rock to construct the cross plot of the first group of PCA data, and acquire the threshold of the first group of PCA data, which is required for division of the karst cave; and based on the threshold of the first group of PCA data, carry out cross analysis on the first group of high-precision characteristic value simulation result data bodies, so as to obtain the characteristics of the 3D spatial morphologies of the karst cave;

the module for characterizing the lithological and physical boundaries of internal filling of the cave is configured to characterize the lithological and physical boundaries of internal filling of the cave: analyzing the characteristic parameters sensitive to the reservoir, which correspond to the data points of the karst cave, by the PCA method, so as to obtain the second group of PCA data sensitive to the response of the fillings;

based on the second group of PCA data, generating the second group of high-precision characteristic value simulation result data bodies by the functions described in the inter-well reservoir parameter simulation module;

based on the second group of PCA data sensitive to the response of the fillings, carrying out cross analysis to obtain the distribution diagram of the second group of discrete data points of various geological bodies;

based on the lithological information and the physical information, acquiring the interpretation conclusion of the second group of discrete data points of various geological bodies, and distinguishing the types of the fillings to construct the cross plot of the second group of PCA data, so as to obtain the threshold of the second group of PCA data, which is required for division of the types of the internal fillings of the karst cave; and based on the threshold of the second group of PCA data, carrying out cross analysis on the second group of high-precision characteristic value simulation result data bodies, so as to obtain the characteristics of the 3D spatial morphologies of different types of internal fillings of the karst cave; and the module for describing the structure and the filling of the paleokarst cave is configured to engrave the spatial distribution of the paleokarst cave and the development characteristics of the internal filling adopting different types of internal fillings by adopting the lithology shielding technology and the 3D engraving technology based on the characteristics of the 3D spatial morphologies of the karst cave and the characteristics of the 3D spatial morphologies of different types of internal fillings of the karst cave.

Those skilled in the art can clearly understand that in order to describe the present invention conveniently and concisely, the specific work process and related description of the system described above can refer to the corresponding process in the embodiment of the method described above, which are not repeated here.

It should be noted that: for the system for intelligently dividing the filling characteristics for the paleokarst cave type reservoir, which is provided by the above embodiment, only the division of all the above function modules is illustrated, and in the actual application, the above function allocation can be completed by different function modules as required, namely, the modules or the steps in the embodiment of the present invention are decomposed or recombined; and for example, the modules in the above embodiment can be combined into one module or can be further split into a plurality of sub-modules, so as to complete all or a part of the functions described above. The names of the modules and the steps involved in the embodiment of the present invention are only used for distinguishing all the modules or the steps and are not regarded as the improper limit to the present invention.

Electronic equipment in a third embodiment of the present invention comprises: at least one processor; and a memory that is in communication connection with the at least one processor, wherein the memory is configured to store instructions capable of being executed by the processor(s); and the instructions are used for being executed by the processor(s) for realizing the method for evaluating the filling characteristics of the deep paleokarst reservoir through well-to-seismic integration.

A computer readable storage medium in a fourth embodiment of the present invention is configured to store computer instructions; and the computer instructions are used for being executed by a computer for realizing the method for evaluating the filling characteristics of the deep paleokarst reservoir through well-to-seismic integration.

Those skilled in the art can clearly understand that in order to describe the present invention conveniently and concisely, the specific work process and related description of a storage device and a processing device that are described above can refer to the corresponding process in the embodiment of the method described above, which are not repeated here.

Computer program codes used for executing the operation of the present application can be edited by adopting one or multiple programming languages or the combination thereof, and the above programming language comprises an object-oriented programming language, such as Java, Smalltalk and C++ and also comprises a conventional procedure programming language, such as a 'C' language or a similar programming language. The program codes can be completely/partly executed on the computer of a user; or the program codes can be executed as an independent software package; or a part of the program codes can be executed on the computer of the user, and a part of the program codes can be executed on a remote computer; or the program codes can be completely executed on the remote computer or a server. In the case that the remote computer is involved, the remote computer can be connected to the computer of the user by any type of network which comprises an LAN (Local Area Network) or a WAN (Wide Area Network), or can be connected to an outer computer (for example, the remote computer can be connected by an Internet by using an Internet service provider).

A flow chart and block diagrams in the drawings show the system architecture, functions and operations that may be realized according to the system, the method and a computer program product of all the embodiments of the present application. In the regard, each block in the flow chart or the block diagrams can represent one module, a program segment or a part of the codes, and the module, the program segment or a part of the codes comprises one or more executable instructions used for realizing specified logic functions. It should also be noted that the functions marked in the blocks may also be generated in the order different from that marked in the drawings in some implementations as the replacements. For example, two blocks shown in succession can actually be executed in parallel basically, and sometimes, the two blocks can also be executed in reverse order, which are determined according to the involved functions. It should also be noted that each block in the block diagrams and/or the flow chart and the combination of the blocks in the block diagrams and/or the flow chart can be realized by a dedicated hardware-based system for executing the specified functions or operations or can be realized by the combination of dedicated hardware and the computer instructions.

The terms: 'first', 'second' and so on are used for distinguishing similar objects, rather than for describing or expressing a specific order or sequence.

The term 'comprise' or any other similar term aims to cover non-exclusive 'comprise', so that a process, a method, an article or equipment/a device comprising a series of elements not only comprise those elements, but also comprise other elements that are not listed definitely, or comprise inherent elements of the process, the method, the article or the equipment/the device.

So far, the technical scheme of the present invention is described by the preferred implementation manners shown through combination with the drawings; however, those skilled in the art easily understand that the protection scope of the present invention is apparently not limited to the specific implementation manners. Those skilled in the art can make equivalent modifications or replacements to the related technical characteristics on the premise of not departing from the principle of the present invention, and the technical schemes after the modifications or replacements are made shall fall within the protection scope of the present invention.

What is claimed is:

1. A method for evaluating filling characteristics of a deep paleokarst reservoir through well-to-seismic integration, comprising the following steps:

Step S100, acquiring original geophysical logging data: acquiring original logging data of each sample well by logging equipment, comprising: measuring the self-potential SP of each sample well by a measuring electrode, measuring the natural gamma ray GR of each sample well by a natural gamma ray downhole device and a natural gamma ray ground instrument, and acquiring the caliper CAL of each sample well by a caliper arm; and acquiring data of a resistivity curve: deep lateral logging RLLD, shallow lateral logging RLLS and micro-lateral logging RLLM, and data of a physical property characterization curve: compensated neutrons CNL, a compensated acoustic curve AC and a density curve DEN by traditional logging equipment; and acquiring definite lithological information and physical information of an individual depth segment based on imaging logging information, drilling information, mud logging information and rock-core information, so as to determine depth data of a marker bed at a target horizon;

Step S200, acquiring seismic data: acquiring data of an original seismic wave reflected signal by a seismic wave excitation device and a receiving device and acquiring isochronous 3D distribution of the marker bed at the target horizon according to the waveform of the data of the original seismic wave reflected signal;

Step S300, preprocessing original geophysical logging data: drawing data of logging curves based on all original logging data of the sample wells and carrying out abnormal value processing and standardization processing, so as to obtain data of standardized logging curves;

Step S400, preprocessing the seismic data: obtaining a high-precision 3D seismic amplitude data body by mixed-phase wavelet estimation and maximum posteriori deconvolution and enhancing diffusion filtering based on the data of the seismic wave reflected signal;

Step S500, carrying out well-to-seismic calibration and selecting the characteristic parameters: acquiring a wave impedance curve of each sample well based on the compensated acoustic curve AC and the density curve DEN in the data of the standardized logging curve, so as to calculate a reflection coefficient curve; acquiring the preferred frequency of the ricker wavelet, so that the preferred frequency is consistent with the dominant frequency of the high-precision 3D seismic amplitude data body; carrying out convolution operation on the ricker wavelet and the reflection coefficient curve, so as to obtain a synthetic seismic record; comparing the depth data of the marker bed at the target horizon and the isochronous 3D distribution of the marker bed at the target horizon for well-to-seismic calibration; calculating the correlation between the synthetic seismic record and the waveform of a near-well seismic channel; and when the correlation is more than or equal to a preset first threshold, judging that the result of well-to-seismic calibration is qualified, so as to obtain the time-depth transforming relationship between the data of the logging curve and the seismic record and the characteristic parameters sensitive to the reservoir, wherein a method for obtaining the characteristic parameters sensitive to the reservoir comprises:

drawing a columnar statistical graph of responses of the logging parameters, which are generated to different geological bodies near the wells; and when the numerical value of data of a certain standardized logging curve can be used for distinguishing data points that are more than a second threshold preset by different logging interpretation conclusions, selecting the data of the standardized logging curve as the characteristic parameters sensitive to the reservoir, wherein the characteristic parameters sensitive to the reservoir at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;

Step S600, acquiring a first group of PCA (Principal Component Analysis) data: optimizing the data of the standardized logging curves from the characteristic parameters sensitive to the reservoir, wherein the number of pieces of the data is preset; and conducting dimensionality reduction on the characteristic parameters sensitive to the reservoir by a PCA method, so as to obtain the first group of PCA data sensitive to the reservoir;

Step S700, constructing an isochronous framework model: constructing the isochronous framework model based on the law of sedimentary strata reflected by the high-precision 3D seismic amplitude data body and the time-depth transforming relationship;

Step S800, simulating the parameters of an inter-well reservoir: based on the first group of PCA data of each sample well, determining the parameter of the optimal sample number, which can reflect the overall geological condition; selecting the first group of PCA data of the sample wells to construct an initial model, wherein the first group of PCA data has the highest correlation of the seismic waveforms, and the number of pieces of first group of PCA data is equal to the parameter of the optimal sample number; constantly correcting the parameters of the initial model; and outputting a first group of high-precision characteristic value simulation result data bodies, wherein the first group of high-precision characteristic value simulation result data bodies is data bodies corresponding to the first group of PCA data one to one;

Step S900, characterizing the boundary of an inter-well karst cave system: carrying out cross analysis based on the first group of PCA data of the sample wells, so as to obtain a distribution diagram of a first group of discrete data points of various geological bodies;

based on the lithological information and the physical information, acquiring the interpretation conclusion of the distribution diagram of the first group of discrete data points of various geological bodies, dividing a karst cave and a surrounding rock to construct a cross plot of the first group of PCA data, and acquiring the threshold of the first group of PCA data, which is required for division of the karst cave; and based on the threshold of the first group of PCA data, carrying out cross analysis on the first group of high-precision characteristic value simulation result data bodies, so as to obtain the characteristics of the 3D spatial morphologies of the karst cave;

Step S1000, characterizing the lithological and physical boundaries of internal filling of the cave: based on data points of the karst cave in the cross plot of the first group of PCA data, analyzing the characteristic parameters sensitive to the reservoir, which correspond to data points of the karst cave, by the PCA method, so as to obtain a second group of PCA data sensitive to the response of fillings;

based on the second group of PCA data, generating a second group of high-precision characteristic value simulation result data bodies by the method described in Step S800;

based on the second group of PCA data sensitive to the response of the fillings, carrying out cross analysis to obtain a distribution diagram of a second group of discrete data points of various geological bodies;

based on the lithological information and the physical information, acquiring the interpretation conclusion of the second group of discrete data points of various geological bodies, and distinguishing the types of the fillings to construct a cross plot of the second group of PCA data, so as to obtain the threshold of the second group of PCA data, which is required for division of the types of the internal fillings of the karst cave; and based on the threshold of the second group of PCA data, carrying out cross analysis on the second group of high-precision characteristic value simulation result data bodies, so as to obtain the characteristics of the 3D spatial morphologies of different types of internal fillings of the karst cave; and Step S1100, describing the structure and the filling of the paleokarst cave: based on the characteristics of the 3D spatial morphologies of the karst cave and the characteristics of the 3D spatial morphologies of different types of internal fillings of the karst cave, engraving the spatial distribution of the paleokarst cave and the development characteristics of the internal filling adopting different types of internal fillings by adopting a lithology shielding technology and a 3D engraving technology.

2. The method for evaluating filling characteristics of the deep paleokarst reservoir through well-to-seismic integration according to claim 1, wherein the step of measuring the self-potential SP of each sample well by the measuring electrode and measuring the natural gamma ray GR of each sample well by the natural gamma ray downhole device and the natural gamma ray ground instrument specifically comprises:

measuring the self-potential SP of each sample well by the measuring electrode:

arranging a measuring electrode $Q_{electrode}$ on the ground and arranging a measuring electrode $Z_{electrode}$ under the well by a cable;

lifting the measuring electrode $Z_{electrode}$ along the well axis to measure the change of the self-potential with the well depth, wherein a calculation method of the value of the self-potential is shown as follows:

$$E_A = (K_d - K_{da})lg\frac{R_{mf}}{R_w}$$

wherein $E_A$ represents the total self-potential; $K_d$ represents the coefficient of diffusion potential; $K_{da}$ represents the coefficient of diffusion and adsorption potential; $R_{mf}$ represents the value of resistivity of mud filtrate; and $R_W$ represents the value of resistivity of stratum water; and measuring the natural gamma ray GR of each sample well by the natural gamma ray downhole device and the natural gamma ray ground instrument:

wherein the natural gamma ray downhole device comprises a detector, an amplifier and a high-voltage power supply;

acquiring the natural gamma ray by the detector, transforming the natural gamma ray into an electric pulse signal and amplifying the electric pulse signal by the amplifier; and transforming the number of electric pulses formed in each minute into the potential difference and recording the potential difference by the ground instrument.

3. The method for evaluating filling characteristics of the deep paleokarst reservoir through well-to-seismic integration according to claim 1, wherein the PCA method specifically comprises:

Step B100, calculating the average value of the samples:

$$\bar{x} = \frac{1}{N}\sum_{i=1}^{N}x_i$$

wherein N represents the total sample number of the curve; i represents the parameter of the sample number, $x_i$ represents the $i^{th}$ data of the characteristic parameters of the sample, and represents the average value of the samples;

Step B200, normalizing each parameter curve to obtain the normalized data $x_S$ of the characteristic parameters of the sample:

$$x_s = \frac{x - \bar{x}}{N}$$

wherein x represents the data of sampling points of the characteristic parameters of the sample;

Step B300, based on the normalized data $x_S$ of the characteristic parameters of the samples, calculating the covariance Cov(X,Y) of the characteristic parameters of the samples:

$$Cov(X, Y) = E[(X - E(X))(Y - E(Y))] = \frac{1}{N-1}\sum_{c=1}^{N}(x_c - \bar{x})(y_c - \bar{y})$$

wherein $x_c$ represents the $c^{th}$ data of the characteristic parameters of an X sample, and $y_c$ represents the $c^{th}$ data of the characteristic parameters of a Y sample;

Step B400, based on the covariance of the characteristic parameters of the samples, constructing a covariance matrix of the characteristic parameters of the samples:

$$\text{Cov}(X, Y, Z) = \begin{bmatrix} \text{Cov}(X, X) & \text{Cov}(X, Y) & \text{Cov}(X, Z) \\ \text{Cov}(Y, X) & \text{Cov}(Y, Y) & \text{Cov}(Y, Z) \\ \text{Cov}(Z, X) & \text{Cov}(Z, Y) & \text{Cov}(Z, Z) \end{bmatrix}$$

wherein Z represents the data of the characteristic parameters of the sample, and
the covariance matrix comprising the data of the characteristic parameters of p types of samples is:

$$\text{Cov}(K) = \begin{bmatrix} \text{Cov}(K_{1,1}) & \cdots & \text{Cov}(K_{1,p}) \\ \vdots & \ddots & \vdots \\ \text{Cov}(K_{p,1}) & \cdots & \text{Cov}(K_{p,p}) \end{bmatrix}$$

wherein K represents the multiple data of the characteristic parameters of the samples, and $\text{Cov}(K_{1,p})$ represents the covariance of first data of the characteristic parameters of the sample and $p^{th}$ data of the characteristic parameters of the sample;

Step B500, based on the covariance matrix comprising p types of data of the characteristic parameters of the samples, acquiring the characteristic values $\widehat{\lambda}_1$, $\widehat{\lambda}_2, \ldots, \widehat{\lambda}_p$ and p characteristic vectors $\vec{e}_1, \vec{e}_2, \ldots \vec{e}_p$ of the covariance matrix; and based on the characteristic values and the characteristic vectors, calculating the PCA data comprising p types of characteristic values:

$$m_j = \sum_{j=1}^{p} \vec{e}_j n_j$$

wherein $m_j$ represents a $j^{th}$ vector of the PCA data; $n_j$ represents a $j^{th}$ vector of the data of the characteristic parameters of the sample; $\vec{e}_j$ represents a $j^{th}$ characteristic vector of the data of the characteristic parameters of the sample; and j meets the condition: $j \in 1, 2, \ldots p$ and represents the counting parameter; and Step B600, based on the PCA data comprising p types of characteristic values, sorting the corresponding characteristic values from large to small, so as to obtain the characteristic values $\widehat{\lambda}_1, \widehat{\lambda}_2, \ldots, \widehat{\lambda}_p$ sorted from large to small, and calculating the accumulative contribution of the covariance:

$$C_k = \sum_{j=1}^{k} \frac{\lambda_j}{\sum_j \lambda_j}$$

wherein $\lambda_j$ represents the $j^{th}$ characteristic value sorted from large to small, $C_k$ represents the accumulative contribution of the front k covariance, and k meets the condition: $k \in 1, 2, \ldots, p$; and when k is constantly increased from 1, selecting the vector of the PCA data, which corresponds to the corresponding front k covariance when $C_k$ is more than the third threshold for the first time, i.e. the PCA data obtained by the PCA method.

4. The method for evaluating filling characteristics of the deep paleokarst reservoir through well-to-seismic integration according to claim 1, wherein Step S400 specifically comprises:

Step S410, based on the data of the seismic wave reflected signal, expressing a frequency domain seismic record convolution model as:

$$s(\omega) = \sigma(\omega)\varepsilon(\omega)$$

wherein $s(\omega)$ represents the seismic record after Fourier transformation; $\sigma(\omega)$ represents the wavelet after Fourier transformation; $\varepsilon(\omega)$ represents the frequency spectrum of the reflection coefficient after Fourier transformation; and co represents the angular frequency;

Step S420, transforming logarithms on the two sides of the equation of the frequency domain seismic record convolution model into a linear system to obtain a linear seismic record convolution model:

$$\ln s(\omega) = \ln \sigma(\omega) + \ln \varepsilon(\omega)$$

Step S430, carrying out inverse Fourier transformation on the linear seismic record convolution model to obtain a complex cepstrum sequence:

$$\tilde{s}(t) = \tilde{\sigma}(t) + \tilde{\varepsilon}(t)$$

wherein $\tilde{s}(t)$ represents a complex cepstrum sequence of a seismic waveform record; $\tilde{\sigma}(t)$ represents a complex cepstrum sequence of the seismic wavelet; $\tilde{\varepsilon}(t)$ represents a complex cepstrum sequence of the stratum reflection coefficient; and t represents the time of the seismic waveform record;

Step S440, based on the complex cepstrum sequence, separating the wavelet and the reflection coefficient by a low-pass filter and extracting a wavelet amplitude spectrum;

Step S450, acquiring a simulated seismic wavelet amplitude spectrum by a least square method:

$$\sigma(f) = A(f) f^\alpha e^{H(f)}$$

wherein the fitting parameter $\alpha \geq 0$ of the least square method is a constant; $\sigma(f)$ represents the wavelet amplitude spectrum; $H(f)$ and $A(f)$ represent the polynomials off; and f represents the frequency of the seismic wavelet;

Step S460, based on the simulated seismic wavelet amplitude spectrum, obtaining the maximum phase component and the minimum phase component of the wavelet, wherein it is assumed that the maximum phase component of the wavelet $\sigma(t_{theo})$ is $u(t_{theo})$, and the minimum phase component of the wavelet $\sigma(t_{theo})$ is $v(t_{theo})$, the wavelet $\sigma(t_{theo})$ is:

$$\sigma(t_{theo}) = u(t_{theo}) \cdot v(t_{theo})$$

the complex cepstrum of the amplitude spectrum is expressed as follows:

$$2\tilde{\sigma}_0(t_{theo}) = \tilde{u}(t_{theo}) + \tilde{v}(t_{theo}) + \tilde{u}(-t_{theo}) + \tilde{v}(-t_{theo})$$

wherein the complex cepstrum $\tilde{\sigma}_0(t_{theo})$ of the amplitude spectrum is displayed symmetrically on the positive axis and the negative axis; $\tilde{v}(-t_{theo})$ represents the complex cepstrum of the minimum phase function corresponding to the maximum phase component $v(t_{theo})$ of the seismic wavelet; and $\tilde{u}(-t_{theo})$ represents the complex cepstrum of the maximum phase function corresponding to the minimum phase component $u(t_{theo})$ of the seismic wavelet;

Step S470, based on the complex cepstrum in the amplitude spectrum, determining a group of mixed-phase wavelet sets with the same amplitude spectrum; constantly adjusting the parameters of the Yu wavelet; keeping the low frequency, broadening the high frequency and properly increasing the dominant frequency to construct the expected output wavelet form; and looking for the best balance point for improving the resolution ratio and the fidelity with reference to a signal-to-noise ratio spectrum under the control of the logging curves, so as to obtain data of the waveform after shaping;

Step S480, based on the data of the waveform after shaping, constructing a tensor diffusion model:

$$\begin{cases} \frac{\partial U}{\partial \tau} = div(D \cdot \nabla U) \\ U|_{\tau=0} = U_0 \end{cases}$$

wherein $\tau$ represents the diffusion time; div represents the divergence operator; D represents the diffusion tensor; U represents the diffusion filtering result; $U|_{\tau=0}$ represents the diffusion filtering result when $\tau=0$; $U_0$ represents the data of the waveform after shaping when $\tau=0$; and as the initial condition of the tensor diffusion model, $\nabla U$ represents the gradient of the diffusion filtering result;

based on the tensor diffusion model, constructing the gradient structure tensor:

$$J_\beta(\nabla U) = G_\rho * J_0 = G_\rho * (\nabla U(\nabla U)^T)$$

wherein U represents the diffusion filtering result, and $J_0$ represents the tensor product of the gradient vector; the Gaussian function with the scale of p is expressed by $G_\rho$:

$$G_\rho(r) = (2\pi\rho^2)^{-3/2} \exp(-|r|^2/(2\rho^2))$$

wherein r represents the calculation radius; the characteristic vector of the structure tensor is:

$$J_\rho(\nabla U) = (v_1 \; v_2 \; v_3) \begin{pmatrix} \xi_1 & 0 & 0 \\ 0 & \xi_2 & 0 \\ 0 & 0 & \xi_3 \end{pmatrix} (v_1 \; v_2 \; v_3)^T$$

wherein $v_1$, $v_2$ and $v_3$ represent three characteristic vectors of the gradient structure tensor and can be regarded as a local orthogonal coordinate system; $v_1$ points to the gradient direction of the seismic signal; a plane formed by $v_2$ and $v_3$ is in parallel to the local structure characteristics of the seismic signal; and $\xi_1$, $\xi_2$ and $\xi_3$ represent three characteristic values corresponding to $v_1$, $v_2$ and $v_3$ respectively;

Step S490, based on the characteristic vector of the structure tensor, respectively calculating the confidence degree of a linear structure, the confidence degree of a face structure and the diffusion tensor, wherein the confidence degree $C_{line}$ of the linear structure is:

$$C_{line} = \frac{\lambda_2 - \lambda_3}{\lambda_2 + \lambda_3}$$

the confidence degree $C_{plane}$ of the face structure is:

$$C_{plane} = \frac{\lambda_1 - \lambda_2}{\lambda_1 + \lambda_2}$$

and the diffusion tensor D is:

$$D = (v_1 v_2 v_3) \begin{pmatrix} \mu_1 & 0 & 0 \\ 0 & \mu_2 & 0 \\ 0 & 0 & \mu_3 \end{pmatrix} (v_1 v_2 v_3)^T = \begin{pmatrix} D_{11} & D_{12} & D_{13} \\ D_{21} & D_{22} & D_{23} \\ D_{31} & D_{32} & D_{33} \end{pmatrix}$$

wherein $\mu_1$, $\mu_2$ and $\mu_3$ represent three non-negative characteristic values of the diffusion tensor and respectively represent the intensity of filtering of the diffusion filter in the three characteristic directions $v_1$, $v_2$ and $v_3$; and Step S4100, repeating the steps S480-S490 until the preset number of iterations is achieved, so as to obtain the diffusion filtering result, i.e. the high-precision 3D seismic amplitude data body.

5. The method for evaluating filling characteristics of the deep paleokarst reservoir through well-to-seismic integration according to claim 4, wherein a calculation method of the simulated seismic wavelet amplitude spectrum comprises:

positioning the maximum value of an amplitude spectrum in the data of the seismic wave reflected signal and the frequency corresponding to the maximum value;

fitting the maximum value of the amplitude spectrum of the seismic signal and the simulated seismic wavelet amplitude spectrum by the least square method to obtain the coefficients of the polynomials of the parameters a and H(f), so as to obtain the fit amplitude value of the corresponding frequency of the maximum value; and dividing the fit amplitude value of the corresponding frequency by the maximum value of the amplitude spectrum of the seismic signal, so as to fit the coefficient of the polynomial A(f) by the quotient.

6. The method for evaluating filling characteristics of the deep paleokarst reservoir through well-to-seismic integration according to claim 1, wherein Step S800 specifically comprises:

Step S810, optionally selecting a sample well as a reference target well and setting the parameter of the initial sample number as 1;

Step S820, according to the principle of similarity of the waveforms, selecting the first group of PCA data of the sample wells and a first group of PCA data of the reference target well for correlation analysis, so as to obtain the correlation value of the parameter of the sample number and the first group of PCA data of the reference target well, wherein the number of pieces of first group of PCA data of the sample wells is equal to the parameter of the sample number;

Step S830, increasing the parameter of the sample number 1 by 1; repeating the method of Step S820 to obtain the correlation value of the parameter of the sample number and the first group of PCA data of the reference target well, which corresponds to each parameter of the sample number; and connecting all the correlation values of the parameter of the sample number and the first group of PCA data of the reference target well, so as to obtain a correlation curve with the correlation of the first group of PCA data of the reference well changing with the parameter of the sample number;

Step S840, selecting another sample well as a reference target well; repeating the methods of Step S810-Step S830 to obtain multiple correlation curves with the correlation of the first group of PCA data of the reference well changing with the parameter of the sample number; fitting all the correlation curves with the correlation of the waveforms of the first group of PCA data of the reference well changing with the parameter of the sample number into an overall correlation curve; selecting an inflection point capable of enabling the correlation in the overall correlation curve to be increased with the increase of the parameter of the sample number and to be finally kept at a stable position; and determining the parameter of the optimal sample number;

Step S850, based on the high-precision 3D seismic amplitude data body and the isochronous framework model, calculating the correlations of the waveforms of point positions to be detected and the positions of the sample wells; sorting the correlations of the waveforms from large to small; and based on the sample wells corresponding to the characteristic data of the seismic waveforms of the sample wells having the highest correlation, constructing the initial model by an inter-well characteristic parameter interpolation manner;

Step S860, based on the initial model, selecting the first group of PCA data of the sample wells as prior information, wherein the first group of PCA data has the highest correlation of the seismic waveforms, and the number of pieces of first group of PCA data is equal to the parameter of the optimal sample number;

Step S870, carrying out matched filtering on the initial model and the prior information, so as to obtain the maximum likelihood function;

Step S880, based on the maximum likelihood function and the prior information, solving the statistical distribution density of the posterior probabilities under a Bayesian framework, and sampling the statistical distribution density of the posterior probabilities to obtain the objective function; and Step S890, sampling the distribution of the posterior probabilities by an MCMC method and the criterion for Metropolis-Hastings sampling and by taking the objective function as the input of the initial model; constantly optimizing the parameters of the initial model; selecting the solution when the maximum value is selected for the objective function as random implementation; selecting the average value of multiple random implementations as the expected output value; and taking the expected output value as the high-precision characteristic value simulation result data bodies, wherein the parameters in the high-precision characteristic value simulation result data bodies correspond to the characteristic parameters corresponding to the first group of PCA data one to one.

7. The method for evaluating filling characteristics of the deep paleokarst reservoir through well-to-seismic integration according to claim 6, wherein Step S880 specifically comprises:

Step S881, by utilizing the law that the white noise meets Gaussian distribution, expressing the parameter of the high-precision characteristic value simulation result data bodies as:

$Y_{sim} = X_{sim} + N_{noise}$ wherein $Y_{sim}$ represents the parameter of the high-precision characteristic value simulation result data bodies, $X_{sim}$ represents the to-be-solved actual characteristic parameter value of the subsurface stratum, and $N_{noise}$ represents the random noise;

Step S882, as $\|X_{sim} - X_p\|^2$ also meets Gaussian distribution, determining the initial objective function as:

$$J_1 = \frac{\|X_{sim} - X_p\|^2}{2\sigma^2}$$

wherein $J_1$ represents the function related to posterior information; $X_p$ represents the expected value of the characteristic parameter, which is obtained by calculation after the steps of selecting the sample wells based on the optimal sample number, carrying out matched filtering on characteristic curves of the sample wells and then solving the statistical distribution density of the posterior probabilities; and a represents the covariance of the white noise; and Step S883, based on the initial objective function, introducing the prior information into the objective function by maximum posterior estimation, so as to obtain the following stable objective function:

$J(Z_{sim}) = J_1(Z_{sim}) + \lambda^2 J_2(Z_{sim})$ wherein $Z_{sim}$ represents the characteristic parameter to be simulated; $J_2$ represents the function related to the prior information of the geological data and the logging data; and $\lambda$ represents the smoothing parameter used for coordinating the mutual effect between $J_1$ and $J_2$.

8. The method for evaluating filling characteristics of the deep paleokarst reservoir through well-to-seismic integration according to claim 6, wherein Step S890 specifically comprises:

Step S891, setting M as the target space, setting n as the total sample number and setting m as the sample number when the Markov chain is stable;

Step S892, presetting a Markov chain to enable the Markov chain to be converged to stable distribution;

Step S893, starting from a certain point $P_0$ in M, carrying out sampling simulation by the Markov chain and generating a point sequence: $P_1, \ldots, P_n$ Step S894, expressing the expected estimation of the function $J_2(P)$ as:

$$E[J_2(P)] = \frac{1}{n-m} \sum_{L=m+1}^{n} f(P^{(L)})$$

wherein n represents the total sample number, m represents the sample number when the Markov chain is stable, and L represents the accumulated parameter;

Step S895, selecting the transition function $q(P; P^{(h-1)})$ and the initial value $Z^{(0)}$, wherein if the parameter value when the $h^{th}$ iteration is started is $P^{(h-1)}$, the $h^{th}$ iteration process comprises:

extracting the alternative value P' from $q(P; Z^{(h-1)})$ and calculating the probability of acceptance $\alpha(Ph^{(h-1)}, P')$ of the alternative value Z':

$$\alpha(P^{(h-1)}, P') = \min\left\{\frac{\pi(P^{(h-1)}; P')}{\pi(P^{(h-1)}q(P'; P^{(h-1)}))}\right\}$$

Step S896, enabling $P^{(h)} = P'$ with $\alpha(P^{(h-1)}, P')$ and enabling $P^{(h)} = P^{(h-1)}$ with the probability $1 - \alpha(P^{(h-1)}, P')$; and Step S897, constantly disturbing the parameters of the initial model, repeating the methods of Step S892-Step S896 to achieve the preset number of iterations $h_s$, and obtaining posterior samples $P^{(1)}, P^{(2)}, P^{(3)} \ldots P^{(h_s)}$, so as to calculate the matrix at each order of posterior distribution to obtain the expected output value, wherein the expected output value is taken as the first group of high-precision characteristic value simulation result data bodies.

9. The method for evaluating filling characteristics of the deep paleokarst reservoir through well-to-seismic integration according to claim 1, wherein Step S300 comprises:

Step S310, drawing data of an original logging curve based on the original logging data;

Step S320, removing outliers to obtain data of the logging curve with the outliers removed based on the data of the original logging curve; and Step S330, superposing all data of a histogram of the single logging curve at the positions of the sample wells in a work area based on the data of the logging curve with the outliers removed, and integrating the thresholds to obtain the data of the standardized logging curve.

10. A system for evaluating filling characteristics of a deep paleokarst reservoir through well-to-seismic integration, comprising: an original geophysical logging data acquisition module, a seismic data acquisition module, an original geophysical logging data preprocessing module, a seismic data preprocessing module, a well-to-seismic calibration and characteristic parameter selection module, a module for acquiring a first group of PCA (Principal Component Analysis) data, an isochronous framework model constructing module, an inter-well reservoir parameter simulation module, a module for characterizing the boundary of the inter-well karst cave system, a module for characterizing the lithological and physical boundaries of internal filling of the cave and a module for describing the structure and the filling of the paleokarst cave;

the original geophysical logging data acquisition module is configured to acquire the original logging data of each sample well by the logging equipment, comprising: measuring the self-potential SP of each sample well by the measuring electrode, measuring the natural gamma ray GR of each sample well by the natural gamma ray downhole device and the natural gamma ray ground instrument, and acquiring the caliper CAL of each sample well by the caliper arm; and acquiring the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN by the traditional logging equipment;

acquiring the definite lithological information and physical information of the individual depth segment based on the imaging logging information, the drilling information, the mud logging information and the rock-core information, so as to determine the depth data of the marker bed at the target horizon;

the seismic data acquisition module is configured to acquire the data of the original seismic wave reflected signal by the seismic wave excitation device and the receiving device and acquire isochronous 3D distribution of the marker bed at the target horizon according to the waveform of the data of the original seismic wave reflected signal;

the original geophysical logging data preprocessing module is configured to draw the data of the logging curves based on the original logging data of the sample wells and carry out abnormal value processing and standardization processing, so as to obtain the data of the standardized logging curves;

the seismic data preprocessing module is configured to obtain the high-precision 3D seismic amplitude data body by mixed-phase wavelet estimation and maximum posteriori deconvolution and enhancing diffusion filtering based on the data of the seismic wave reflected signal;

the well-to-seismic calibration and characteristic parameter selection module is configured to carry out well-to-seismic calibration and characteristic parameter selection: acquiring the wave impedance curve of each sample well based on the compensated acoustic curve and the density curve DEN in the data of the standardized logging curve, so as to calculate the reflection coefficient curve; acquiring the preferred frequency of the ricker wavelet, so that the preferred frequency is consistent with the dominant frequency of the high-precision 3D seismic amplitude data body; carrying out convolution operation on the ricker wavelet and the reflection coefficient curve, so as to obtain the synthetic seismic record; comparing the depth data of the marker bed at the target horizon and the isochronous 3D distribution of the marker bed at the target horizon for well-to-seismic calibration; calculating the correlation between the synthetic seismic record and the waveform of the near-well seismic channel; and when the correlation is more than or equal to the preset first threshold, judging that the result of well-to-seismic calibration is qualified, so as to obtain the time-depth transforming relationship between the data of the logging curve and the seismic record and the characteristic parameters sensitive to the reservoir, wherein the method for obtaining the characteristic parameters sensitive to the reservoir comprises:

drawing the columnar statistical graph of the responses of logging parameters, which are generated to the different geological bodies near the wells; and when the value of the data of the certain standardized logging curve can be used for distinguishing the data points that are more than second threshold preset by the different logging interpretation conclusions, selecting the data of the standardized logging curve as the characteristic parameters sensitive to the reservoir, wherein the characteristic parameters sensitive to the reservoir at least comprise the wave impedance IMP and can also comprise one or more of the caliper CAL, the natural gamma ray GR, the self-potential SP, the data of the resistivity curve: the deep lateral logging RLLD, the shallow lateral logging RLLS and the micro-lateral logging RLLM, and the data of the physical property characterization curve: the compensated neutrons CNL, the compensated acoustic curve AC and the density curve DEN;

the module for acquiring the first group of PCA data is configured to optimize the data of the standardized logging curves from the characteristic parameters sensitive to the reservoir, wherein the number of pieces of the data is preset; and carry out dimensionality reduction on the characteristic parameters sensitive to the reservoir by PCA (Principal Component Analysis) method, so as to obtain the first group of PCA data;

the isochronous framework model constructing module is configured to construct the isochronous framework model based on the law of sedimentary strata reflected by the high-precision 3D seismic amplitude data body and the time-depth transforming relationship;

the inter-well reservoir parameter simulation module is configured to determine the parameter of the optimal sample number, which can reflect the overall geological condition, based on the first group of PCA data of each sample well; select the first group of PCA data of the sample wells to construct the initial model, wherein the first group of PCA data has the highest correlation of the seismic waveforms, and the number of pieces of first group of PCA data is equal to the parameter of the optimal sample number; constantly correct the parameters of the initial model; and output the first group of high-precision characteristic value simulation result data bodies, wherein the first group of high-precision characteristic value simulation result data bodies is the data bodies corresponding to the first group of PCA data one to one;

the module for characterizing the boundary of the inter-well karst cave system is configured to carry out cross analysis based on the first group of PCA data of the sample wells, so as to obtain the distribution diagram of the first group of discrete data points of various geological bodies;

based on the lithological information and the physical information, acquire the interpretation conclusion of the distribution diagram of the first group of discrete data points of various geological bodies, divide the karst cave and the surrounding rock to construct the cross plot of the first group of PCA data, and acquire the threshold of the first group of PCA data, which is required for division of the karst cave; and based on the threshold of the first group of PCA data, carry out cross analysis on the first group of high-precision characteristic value simulation result data bodies, so as to obtain the characteristics of the 3D spatial morphologies of the karst cave;

the module for characterizing the lithological and physical boundaries of internal filling of the cave is configured to characterize the lithological and physical boundaries of internal filling of the cave: analyzing the characteristic parameters sensitive to the reservoir, which correspond to the data points of the karst cave, by the PCA method, so as to obtain a second group of PCA data sensitive to the response of the fillings;

based on the second group of PCA data, generating the second group of high-precision characteristic value simulation result data bodies by the functions described in the inter-well reservoir parameter simulation module;

based on the second group of PCA data sensitive to the response of the fillings, carrying out cross analysis to obtain the distribution diagram of the second group of discrete data points of various geological bodies;

based on the lithological information and the physical information, acquiring the interpretation conclusion of the second group of discrete data points of various geological bodies, and distinguishing the types of the fillings to construct the cross plot of the second group of PCA data, so as to obtain the threshold of the second group of PCA data, which is required for division of the types of the internal fillings of the karst cave; and based on the threshold of the second group of PCA data, carrying out cross analysis on the second group of high-precision characteristic value simulation result data bodies, so as to obtain the characteristics of the 3D spatial morphologies of different types of internal fillings of the karst cave; and the module for describing the structure and the filling of the paleokarst cave is configured to engrave the spatial distribution of the paleokarst cave and the development characteristics of the internal filling adopting different types of internal fillings by adopting the lithology shielding technology and the 3D engraving technology based on the characteristics of the 3D spatial morphologies of the karst cave and the characteristics of the 3D spatial morphologies of different types of internal fillings of the karst cave.

* * * * *